United States Patent [19]

Miyakawa et al.

[11] Patent Number: 4,887,252

[45] Date of Patent: Dec. 12, 1989

[54] SOLID-STATE COLOR TELEVISION CAMERA WITH COLOR AND LUMINANCE SIGNAL CORRECTION

[75] Inventors: Yasumi Miyakawa, Hirakata; Tatsuki Ide, Neyagawa, both of Japan

[73] Assignee: Matsushita Electric Industrial Co., Ltd., Kadoma, Japan

[21] Appl. No.: 15,509

[22] Filed: Feb. 17, 1987

Related U.S. Application Data

[63] Continuation of Ser. No. 560,816, Dec. 13, 1985, abandoned.

[30] Foreign Application Priority Data

Dec. 14, 1982 [JP] Japan .................. 57-219405
Dec. 14, 1982 [JP] Japan .................. 57-219406
Aug. 19, 1983 [JP] Japan .................. 58-152032
Oct. 6, 1983 [JP] Japan .................. 58-187898
Oct. 7, 1983 [JP] Japan .................. 58-189073
Oct. 7, 1983 [JP] Japan .................. 58-189074
Oct. 7, 1983 [JP] Japan .................. 58-189092

[51] Int. Cl.[4] .............. H04N 9/07; H04N 5/208; H04N 5/21; H04N 9/64
[52] U.S. Cl. ................. 358/48; 358/36; 358/44; 358/162; 358/167
[58] Field of Search ............ 358/21 R, 21 V, 37, 358/39, 41, 43, 44, 47, 48, 162, 40, 36, 167

[56] References Cited

U.S. PATENT DOCUMENTS

| | | | |
|---|---|---|---|
| 4,071,853 | 1/1978 | Yamanaka | 358/44 |
| 4,141,037 | 2/1979 | Nishimura et al. | 358/44 |
| 4,157,566 | 6/1979 | Nakabe et al. | 358/44 |
| 4,238,765 | 12/1980 | Nagumo | 358/43 |
| 4,434,435 | 2/1984 | Fujimoto | 358/44 |
| 4,467,347 | 8/1984 | Ozawa et al. | 358/44 |
| 4,475,125 | 10/1984 | Esser et al. | 358/162 |
| 4,480,266 | 10/1984 | Hashimoto | 358/43 |
| 4,638,351 | 1/1987 | Clarke | 358/36 |

FOREIGN PATENT DOCUMENTS

| | | | |
|---|---|---|---|
| 0053318 | 6/1982 | European Pat. Off. | |
| 2275091 | 1/1976 | France | |
| 2527032 | 11/1983 | France | 358/44 |
| 55-83383 | 6/1980 | Japan | 358/47 |
| 56-4988 | 1/1981 | Japan | 358/44 |
| 56-28580 | 3/1981 | Japan | 358/21 R |
| 56-44282 | 4/1981 | Japan | 358/44 |

*Primary Examiner*—James J. Groody
*Assistant Examiner*—Randall S. Svihla
*Attorney, Agent, or Firm*—Cushman, Darby & Cushman

[57] ABSTRACT

By using a solid state imaging element which simultaneously read out signals for two neighboring horizontal lines in which modulated chrominance signals differ from each other by 180° of phase using horizontal scanning, the magnitude of the vertical correlation from the simultaneously read out two line signals are detected. Noise normally produced by the vertical correlation error of the luminance signal and chrominance signal are removed. Various embodiments are provided responsive to different problems. An interference signal at ½f can be decreased by compensating the horizontal aperture responsive to the vertical correlation of the image. Improvements are described for use when the color difference signals have a poor level difference, or when the vertical correlation of a signal is poor, or in fact does not exist at all. The horizontal correlation of a signal can also be used to reduce noise from various sources. The color difference signal can also be used to find the vertical correlation of the objective image. Differences between horizontally adjacent chrominance signals can also be obtained. Improvements are described for use when the objective image has a high color saturation, or when the luminance signal is excessively high. A structure for improving unsatisfactory vertical resolution is also described.

19 Claims, 27 Drawing Sheets

F I G. 32
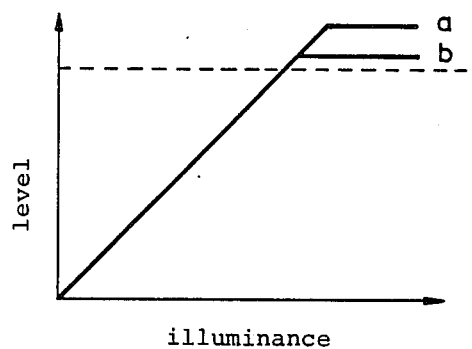

SOLID-STATE COLOR TELEVISION CAMERA WITH COLOR AND LUMINANCE SIGNAL CORRECTION

This is a continuation of application Ser. No. 560,816, filed Dec. 13, 1985, which was abandoned upon the filing hereof.

BACKGROUND OF THE INVENTION

1. Field of the Invention

The present invention relates to an improvement in solid state color imaging apparatus, especially in the circuit configuration of the solid state color imaging apparatus.

2. Description of the Prior Arts

As is well known, there are two types of solid state color imaging device these are charge-coupled devices (hereinafter is referred as CCD) which is a device for transferring electric charges, and bucket-brigade devices (hereinafter is referred as BBD) MOS types device of X-Y address devices also exist. The above-mentined MOS type solid state imaging apparatus is constituted in a manner output an image signal by sequentially switching MOS type transistors by means of a vertical shift register and a horizontal shift register. Accordingly, spike noises due to switching pulses by horizontal scanning is liable to be generated. These spike noises increase as the number of picture elements increase, thereby limiting a S-N ratio of the image.

A solid state imaging device of X-Y address type reads out signal charge from the picture element by addressing. Accordingly there is no crosstalk of signal charge in vertically neighboring picture elements. Accordingly, such X-Y address type solid state imaging device is suitable in a system for obtaining a color signal by utilizing vertical correlation of picture element signals using the mosaic shaped color filter as shown in FIG. 1, wherein dotted line squares show photodiodes of light receiving parts and solid line squares show color filter elements.

Among the CCDs, there are two types. These are frame transfer type CCD in which signal charge of the light receiving parts are transferred to a storing part with a high speed, and the stored signal is sequentially read out through horizontal transferring means. Also, an interline type can be used wherein the signal charge of the photodiodes on corresponding vertical columns the read out respectively to are vertical transfer lines. The read-out signal charges are further transferred to horizontal transfer means within a subsequent horizontal scanning time, and the signal charges are taken out from the horizontal transfer means in sequence. The former frame transfer type CCD apparatus is not usable in a solid state color imaging apparatus, wherein the color signals are taken out by utilizing vertical correlation, since that type apparatus has a channel stopper only in a vertical direction, and crosstalk of signal charge is generated in vertically neighboring picture elements. Accordingly, it has been necessary in the art to provide an improved system having a stripe-shaped color filter with R-stripes, G-stripes and B-stripes as shown in FIG. 2 thereby to eliminate color distortion even when there is crosstalk. This prior art apparatus has a problem that the band-width of the luminance signal can not be sufficiently wide since spatial repetition period of the color filter is determined by the length of three picture elements.

In the latter interline type apparatus, even a mosaic shaped color filter as shown in FIG. 1 can be used since the photodiodes are disposed isolated corresponding to the spatial area of the color filter elements. However, it has a problem that transfer efficiency of the signal charge in the vertical transfer means can not achieve 100%, and impurities of colors due to residual signal charges in the vertical transfer means are produced.

In order to solve the above-mentioned problems, an improved solid state color imaging apparatus is herein disclosed, wherein effect to picture quality of non-transfer efficiency in vertical transfer means of solid state imaging device is eliminated, lowering of horizontal resolution due to color filter repetition cycle in horizontal direction is prevented and efficiency of light utility is high.

FIG. 3 and FIG. 4 show electrical and filter-disposition configuration for such apparatus.

FIG. 3 shows one example of a circuit connection of the general color solid state imaging sensor of a charge priming transfer type. In FIG. 3, numeral 1 designates a solid state imaging sensor made as a monolithic IC, wherein 2a, 2b, and 2c designate photodiodes. Generally, these photodiodes 2a, 2b, 2c... are made using P-N junctions. The centers of these diodes 2a, 2b, 2c... are disposed in a manner that photodiodes of one horizontal line are disposed in interleaving positions with respect to vertically neighboring horizontal lines, thereby forming a check pattern like disposition. Vertically disposed signal lines 3a, 3b, 3c... are connected to the photodiodes in a manner that photodiodes of one horizontal line are connected to one every other vertically disposed signal lines 3a, 3c, 3e... or 3b, 3d.... That is, in FIG. 3, the first photodiode 2a of the first horizontal line is connected to the first signal line 3a, the first photodiode 2b of the second horizontal line is connected to the second signal line 3b, and so on, respectively through vertical switching MOS FETs 4a, 4b, 4c....

Vertical shift register 5 has input terminals for vertical scanning pulse $\phi_{SP}$ and input terminals for clock pulses $\phi_{V1}$, $\phi_{V2}$, and output terminals of respective stages of the vertical shift register 5 are connected through vertical address lines 6a, 6b, 6c to the gates of MOS FETs 4a, 4a'..., 4b, 4b'..., 4c, 4c'..., 4d, 4d'.... Each end of the signal lines 3a, 3b, 3c... is connected to the sources 7a, 7b, 7c... and 7a', 7b', 7c'... of transfer MOS FETs. Gates of these transfer MOS FETs are connected in common to transfer pulse input line $\phi_{TG}$. Drains of the MOS FETs are commonly connected to each end of transfer capacitors 8a, 8b, 8c... and 8a', 8b', 8c'..., the other ends of which are connected commonly to transfer pulse input line $\phi_{TC}$. Here, the capacitances of the transfer capacitors 8a, 8b..., 8a', 8b'... are sufficiently smaller than those of the vertical disposed signal lines 3a, 3b, 3c....

The drains of the of transfer MOS FETs 7a, 7b... 7a', 7b'... are connected to another transfer gate devices 9a, 9b, 9c... and 9a', 9b', 9c'..., respectively. Control electrodes of these FETs are connected commonly to transfer gate input line $\phi_{TB}$. Output terminals of the gating devices 9a, 9b... and 9a', 9b'... are connected to charge-coupled type horizontal shift registers (hereinafter are referred as horizontal CCD) 10a and 10a', respectively. Output ends of the horizontal CCDs are connected to signal output parts 11a and 11a', respectively. The operation of the Circuit of FIG. 3 will now be discussed.

During one vertical scanning period, incident light from an object signal charges to accumulate in the photodiodes 2a, 2a' ..., 2b, 2b' ..., 2c, 2c' .... By impressing vertical scanning pulses produced by the vertical shift register 5 to the gates of vertical switching MOS FETs 4a, 4a' ..., 4b, 4b' ... 4c, 4c' ..., signal charges stored in the photodiodes 2a, 2a' ..., 2b, 2b' ... 2c, 2c' ... are transferred onto the vertically disposed signal lines 3a, 3b.... Then, by impressing signal voltages on the input lines $\phi_{TG}$ and $\phi_{TC}$, the signal charges which have been transferred to the vertically disposed signal lines 3a ... are further transferred to the transferring capacitance devices 8a, 8b..., 8a', 8b'.... By impressing signal voltage on the transfer gates 9a, 9b..., 9a', 9b'..., the signal charges transferred in the capacitance devices 8a, 8b..., 8a', 8b'... are all transferred to the horizontal CCDs 10a and 10a'. Then, the signal charges transferred to the horizontal CCDs 10a and 10a' are read out to the signal output parts 11a and 11a' by applying an appropriate transferring clock signals to the signals output parts 11a during one horizontal scanning period. The clock frequency of the horizontal transferring is determined by the numbers of photodiodes 2a, 2a' ..., 2b, 2b' ... 2c, 2c' ..., respectively in each horizontal line. When, for instance, 384 photodiodes are disposed in one horizontal line, the clock frequency is about 7.2 MHz.

The solid state imaging sensor, which operates in the above-mentioned principle, is also characterized by reading out signals of plural horizontal lines at a same time within one horizontal scanning period. That is, in the n-th horizontal scanning of the first field, the device simultaneously reads out signals of the two horizontal lines 2a, 2a' ... and 2b, 2b' .... In an (n+1)-th horizontal scanning of the first field, the device simultaneously reads out signals of the two horizontal lines 2c, 2c' ... and 2d, 2d' ..., and further in the second field, reads out signals of the two horizontal lines 2d, 2d' ... and 2e, 2e' ....

FIG. 4 schematically shows one example of a configuration of the color filter for the solid state imaging sensor. In FIG. 4, squares shown by dotted lines schematically designate photodiodes 2a, 2a' ..., 2b, 2b' ..., 2c, 2c' ..., and stripe filters consisting of regular repetition of cyan (Cy) filter 12, yellow (Ye) filter 13 and magenta (M) filter 14. In the disposition, a spatial repetition period of the stripe filter and the photodiodes are equal.

By making the above-mentioned arrangement of the photodiodes 2a ... 2b ... 2c ... and the stripe color filters, in the n-th horizontal scanning, output signals of the photodiodes 2a, 2a', 2a" ..., namely a signal which is spatially modulated by the Cy, Ye and M filters, is produced at the output terminal of the horizontal CCD 11a, and on the other hand, at the output terminal of the horizontal CCD 11a' a signal of the photodiodes 2b, 2b', 2b", namely stripe filters Ye, Cy and M is produced.

In case an operation of the solid state imaging apparatus is made by applying the stripe color filters of the configuration shown in FIG. 4 on the solid state imaging sensor of FIG. 3, signal charges of the horizontal lines 2a, 2a' ... and 2b, 2b' ... shown in FIG. 3 are transferred by horizontal CCDs 10a and 10a' which are operated with a predetermined phase difference at the same time. That is, the output of the CCDs 10a and 10a' are obtainable at the output terminal of their output parts 11a, 11a' in dot sequential manner. Generally, phase differences between the transferring pulses of the first horizontal CCD 10a and the second horizontal CCD 10a' are selected to be separated by 180° of phase from each other. Relative phases and spectral characteristics of the output signal of the horizontal CCDs 10a and 10a' are operated in the above-mentioned way are shown in FIG. 5(A) and FIG. 5(B).

FIG. 5(A) shows the output signal of the first horizontal CCD 10a, namely the output signal of the photodiodes 2a, 2a', 2a" ..., and FIG. 5(B) shows the output signal of the second horizontal CCD 10a, namely the output signal of the photodiodes 2b, 2b', 2b" ....

In FIG. 5, a time period between neighboring color signals is 1/f, where f is horizontal transfer clock frequency. And previously stated, the signals of FIG. 5(A) and FIG. 5(B) have 180° phase difference from each other. In FIG. 5(A) and FIG. 5(B), names of colors mentioned in the squares designate primary colors and names of colors mentioned on the square blocks colors of the stripe filters, colors of which contain the primary colors as a component thereof. This is based on the relationship that, when the intensities of red color, green color and blue color are R, G, B, respectively, then:

$$Cy = (G+B), M = (R+B), Ye = (R+G) \tag{1}$$

FIG. 6(A) and FIG. 6(B) show spectral distributions of the signals shown by FIG. 5(A) and FIG. 5(B), wherein frequency f is a horizontal transfer clock frequency and a modulated chrominance signal is generated to have spectral distribution around a color carrier which is ½f. The phase of the color carriers in this case are opposites as shown by FIG. 7(A) and FIG. 7(B). As shown by FIG. 7(A) and FIG. 7(B), by adding the output signals of CCD 10a and CCD 10a', modulated chrominance signal cancel each other. Furthermore, by the adding, the signals shown in FIG. 8, namely an effective number of photodiodes in one horizontal line is equivalently doubled, and the sampling frequency in horizontal direction is equivalently substantially doubled. FIG. 9 shows a spectral distribution of signals shown in FIG. 8. As is obvious from FIG. 8 and FIG. 9, by adding output signals of the horizontal CCD 10a and CCD 10a', the modulated chrominance signal, which is around ½f frequency, is off-set, and accordingly, the modulated chrominance signal is produced only around a color carrier signal of ⅔f. That is, the actual band width of the luminance signal is limited to a width of ⅔f. However, the value of ⅔f is twice the conventional band width ⅓f of the luminance signal, and therefore the horizontal resolution is greatly improved.

The above-mentioned explanation is made for the n-th horizontal line, that is the lines a and b. A similar explanation applies for the (n+1)-th lines, namely horizontal lines c and d. Furthermorre, for n-th line of the second field, namely horizontal lines b and c, the same apply.

Nextly, an embodiment of electric signal processing circuit of the color solid state imaging is described with reference to FIG. 10.

In FIG. 10, numeral 15 designates a solid state imaging sensor with stripe color filters as described above. A synchronization signal generator 16 produces a synchronization signal to a driving circuit 17 which produces the above-mentioned signals $\phi_{SP}$, $\phi_{V1}$, $\phi_{V2}$, $\phi_{TG}$, $\phi_{TC}$ and $\phi_{TB}$ for driving the solid state imaging sensor 15. Two output signals of the solid state imaging sensor 15 are fed to an adder 18 for being added to each other, and the added output signal is fed through a low pass filter 19 having a pole frequency of ⅔f, producing a luminance signal to an encoder 20. On the other hand, the output of the adder 18 is also given through a band-pass filter 21 having a center frequency of ⅔f, putting out a modulated chrominance signal to synchronized, of synchronous detectors 22 and 23 which detect, using synchronization detection, reference signals having 90° phase differences. The output signals of the synchronization detectors 22 and 23 are passed through low-pass filters 24 and 25 for removing unnecessary high frequency range parts to the encoder 20 to compose a color television signal. The frequencies of the synchronization detection reference signals to be fed to the synchronous detectors 22 and 23 have a frequency of ⅔f and are synchronized with the horizontal transfer clock signal. A phase shifter 26 is provided to give a 90° phase shift between the synchronization detection reference signals to the synchronous detectors 22 and 23.

FIGS. 7(A), (B) are diagrams showing the phase of the output signal from the CCDs 10a and CCD 10a'. The two signals are expressed as $S_{ca}$ and $S_{ca}'$. Thus, expressing the vector diagrams mathematically:

$$S_{ca} = \left( Cy - \frac{M + Ye}{2} \right) \sin \omega t + \frac{3}{2} (Ye - M) \cos \omega t$$

$$S_{ca}' = \left( Cy - \frac{M + Ye}{2} \right) \sin \omega t - \frac{3}{2} (Ye - M) \cos \omega t$$

Here, $\omega$ is $2\pi \frac{2}{3} f$.

$S_{ca}$ and $S_{ca}'$ show the modulated chrominance signal components.

The signal wave in FIG. 8 is obtained by adding the two kinds of signals shown in FIG. 5. The frequency of the modulated chrominance signal in FIG. 8 is twice the frequency of the modulated chrominance signal in FIG. 5.

Then, when the levels of the Cy, Ye and M are equal, the modulated chrominance signal component is zero.

The actual modulated chrominance signal Sc of the output signal of the solid state imaging sensor is given as follows as a general formula.

Provided that output signal of the band-pass filter is Sc, the folowing equation holds as is obvious from FIG. 8 and FIG. 9:

$$Sc = K_1 \left( Cy - \frac{M + Ye}{2} \right) \cdot \sin\omega t + K_2 \frac{\sqrt{3}}{2} (Ye - M) \cdot \cos\omega t \quad (2)$$

wherein $$K_1 < 1, K_2 < 1 \quad \omega = 2\pi \cdot \frac{2}{3} f.$$

Then, by synchronizedly detecting the above-mentioned signal Sc by utilizing the reference signals cos $2\pi \cdot \frac{2}{3} ft$ and sin $2\pi \cdot \frac{2}{3} ft$, then color difference signals of $$K_1 \cdot \left( Cy - \frac{M + Ye}{2} \right) \text{ and } K_2 \cdot \frac{\sqrt{3}}{2} (Ye - M)$$

are obtainable as the output signals of the low-pass filter 24 and low pass filter 25. By modulating the color subcarrier by utilizing these two color difference signals, and by combining the luminance signal thereto, an NTSC composite color television signal is obtainable.

In this color separation system, the color carrier signal appearing at ⅔f frequency is eliminated by off-setting by utilizing vertical correlation (adding of simultaneously read out signals for two lines).

Accordingly, the above-mentioned conventional system has such problem that when a part of the object having no vertical correlation thereat is photographed, there is a possibility of producing some noises in the luminance signal and chrominance signal as follows:

Firstly, the noise in the luminance signal to be produced when the part having no vertical correlation is explained.

FIG. 11 schematically shows one example of an objective image projected on the solid state imaging sensor and locations of photodiodes of the solid state imaging sensor when there is no vertical correlation between the horizontal line signals. In this example, the objective image changes between the upper horizontal line a and lower horizontal line b which together constitute an n-th horizontal line for the signal. Also, the objective image changes between the upper horizontal line e and lower horizontal line f which together constitute an (n+2)-th horizontal line for the signal. That is, the area on and above the line a is red and the area of line b and below until the line e is white, and the bottom area of line f and below is black. Schematic signal charts of the output signal of the adder 18 and the horizontal scanning output signals for n-th line and (n+2)-th line are shown in FIG. 12(A) and FIG. 12(B). As is shown in FIG. 12(A), the signal has one blank time every six picture element scanning times, and therefore, this blank results in producing modulated chrominance signal equivalently having frequency component of ⅔f. Since this modulated chrominance signal is within the band-width of the luminance signal, this becomes an interference signal, i.e., noise to deteriorate picture quality. That is, in a TV image, a noise induced by the ⅔f modulated chrominance signal is produced on the scanning line of the n-th part where the vertical correlation does not exist, thereby producing horizontal dot line noise between the different color regions as shown in FIG. 13. In an actual case, the dotted line is induced by 2.4 MHz signal.

Nextly, an example where no vertical correlation in the horizontal signals is produced in a colorless object is discussed. As shown in FIG. 12(B), when the objective image turns from white to black between the upper line e and the lower line f of an (n+2)-th horizontal line, the white incident light causes generation of signals for R, G and B, but no modulated chrominance signal is generated, since the level of the output signals for the R, G and B color are uniform. However, when color temperature of the objective image changes once, the relative energy to the incident light wavelength changes, and therefore, output singal levels for the R, G and B color filter parts are not uniform as shown in FIG. 12(C). Therefore, another color carrier having the phase and amplitude shown by arrow R' as shown in FIG. 12(D) of the frequency of ⅔f is generated within the frequency range of the luminance signal, and produces a interference signal for the reproduced image. It is very difficult to retain the color temperature constant, even if a color conversion filter is used for all the range of the brightness of area. Therefore, unless the brightness is limited within a very strictly narrow range in order to keep the color temperature balance, there is also a liability of producing dotted line noise as shown in FIG. 13.

Nextly, description is made of chrominance signals for the parts where no vertical correlation of the horizontal signals exist.

FIG. 14 schematically shows a case of an objective image and photodiodes with color filters. In this case, between the horizontal line a and horizontal line b which together constitute an n-th horizontal scanning line, the objective image vertically changes, and also between the horizontal line e and horizontal line f, which together constitute an (n+2)-th horizontal scanning line, the objective image vertically changes. That is, on and above the horizontal line a, the objective image is white, and from line b to line e the objective image is red, and from line f and downward the objective image is green. FIG. 15(A) and FIG. 15(B) shown the output signals of the adder 18 for the scannings of n-th line and (n+2)-th line, respectively. As is obvious from FIG. 15(A), in the signal components obtained from the repetition of photodiodes with six color filters, the intensities of the signal components for red (R), green (G) and blue (B) are R:G:B=4:2:2, and accordingly the chrominance signal of the n-th horizontal line yields a reddish signal, even though there is no actual reddish part in the image. As is obvious from FIG. 15(B), the signal components obtained from the repetition of photodiodes with six color filters, the intensities of the signal components for red (R), green (G) and blue (B) are R:G:B=2:2:0, and accordingly chrominance signal of the (n+2)-th horizontal line is yellowish signal. In this latter case, though the object turns from red to green and no yellowish color existed in the object, the reproduced television image has a yellow horizontal line at the boundaries between the red region and the green region, and the color quality is deteriorated.

As has been described, when signal correlation in vertical direction is zero or small, undesirable dot noise is produced in the luminance signal at that part, and also an undesirable spurious color signal is produced at the part, both deteriorating the image quality.

SUMMARY OF THE INVENTION

The present invention is intended to obtain a superior TV signal by removing the noise produced in the luminance signal and chrominance signal when the vertical correlation is small, by using an electric signal in a solid state color television camera where the signals of the neighboring horizontal lines in which modulated chrominance signals which differ from each other by 180° phase are read out simultaneously by 1H horizontal scanning and are added. Thereby, the modulated chrominance signal components is cancelled and to obtain a high resolution luminance signal.

Therefore, the present invention, the largeness of the vertical correlation is detected by comparing the low frequency components and the modulated chrominance signal components between the two signals read out simultaneously and by controlling the band of the luminance signal with the detected signal and thereby to removing the noise produced in the luminance signal. Then, as to the chrominance signal, the noise produced in the chrominance signal is removed by controlling the level of the chrominance signal with the above-mentioned detected signal.

BRIEF DESCRIPTION OF THE DRAWINGS

FIG. 32 is a graph showing one example of photoelectric transducing characteristics of a solid state imaging sensor used in the present invention.

DESCRIPTION OF THE PREFERRED EMBODIMENTS

In a color solid state imaging apparatus in accordance with the present invention, improvements are made on the circuit in order to eliminate undesirable dot noise and spurious color signal at the horizontal part where vertical correlation between neighboring two lines of photoelectric element i.e. photodiodes.

Figure 1:
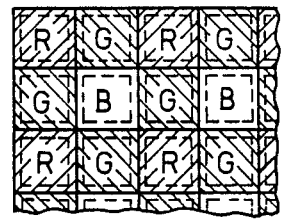
FIG. 1 is the front view showing relative dispositions of color filters and photodiodes in accordance with the prior art.
Figure 2:
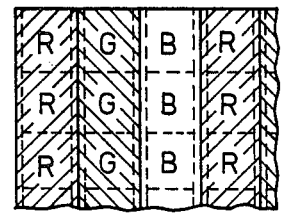
FIG. 2 is the front view showing relative disposition of color filters and photodiodes in accordance with the other prior art.
Figure 3:
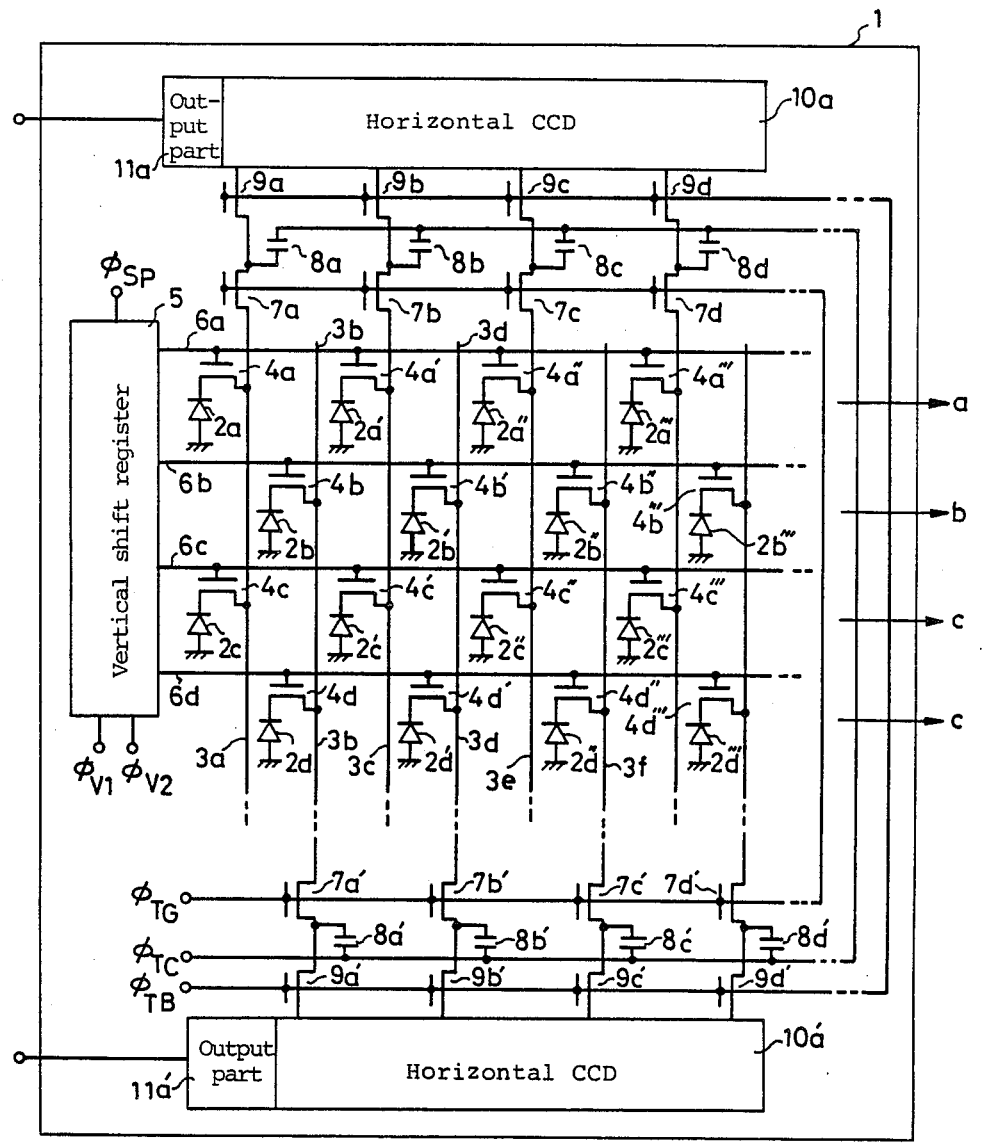
FIG. 3 is the circuit diagram of the general solid state imaging sensor wherein signal of plural horizontal lines are read simultaneously.
Figure 4:
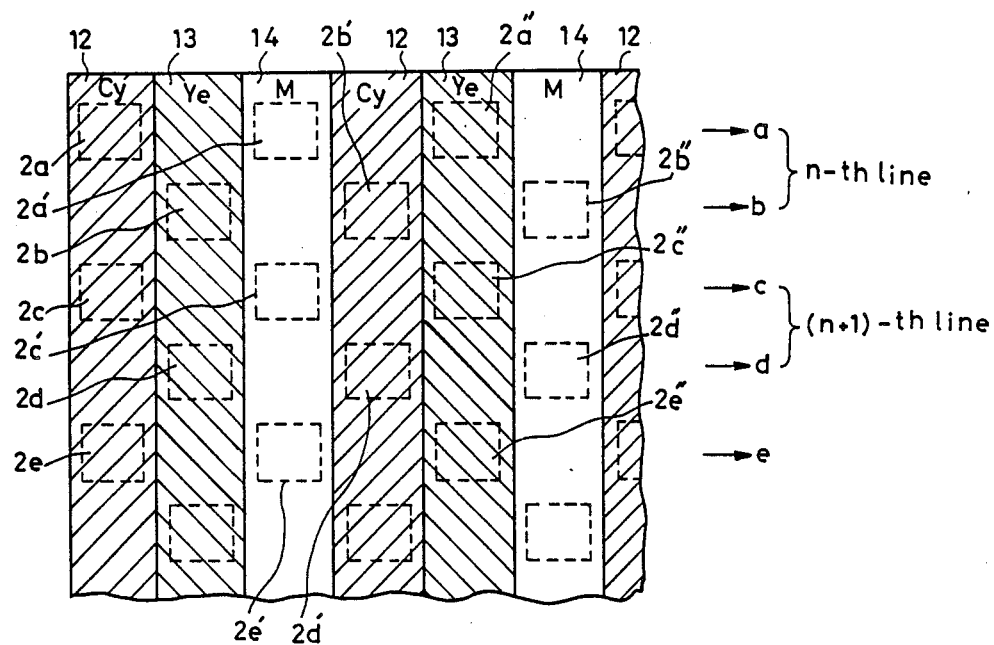
FIG. 4 is the front view showing relative dispositions of color filters and photodiodes of the color solid state imaging apparatus of FIG. 3.
Figure 5A:
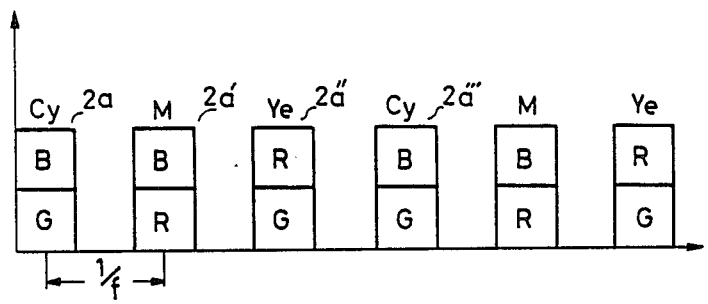
FIG. 5(A) and FIG. 5(B) are the graphs schematically showing output signals obtained by horizontal scannings of the line a and line b of FIG. 4.
Figure 5B:
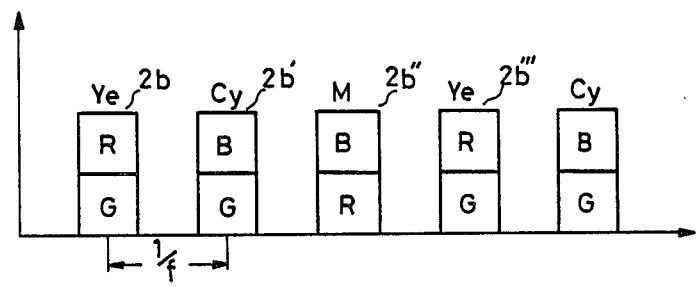
Figure 6A:
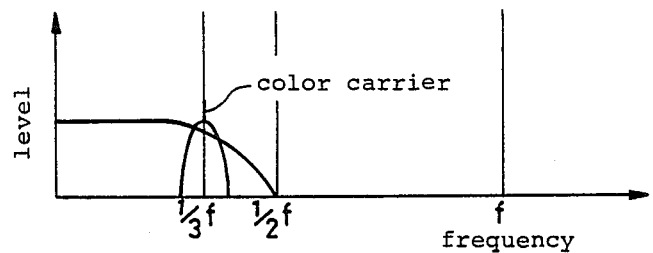
FIG. 6(A) and FIG. 6(B) are the frequency spectral graphs showing the signals of FIG. 5(A) and FIG. 5(B), respectively.
Figure 6B:
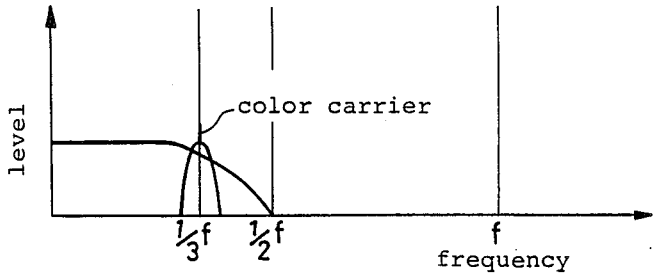
Figure 7A:
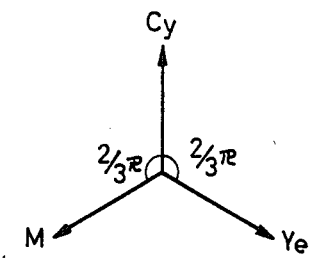
FIG. 7(A) and FIG. 7(B) are the vector graphs showing phases of the color carriers of signals of FIG. 5(A) and FIG. 5(B), respectively.
Figure 7B:
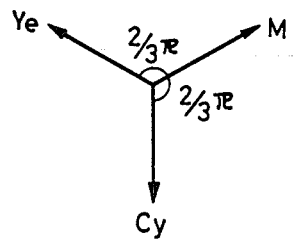
Figure 8:
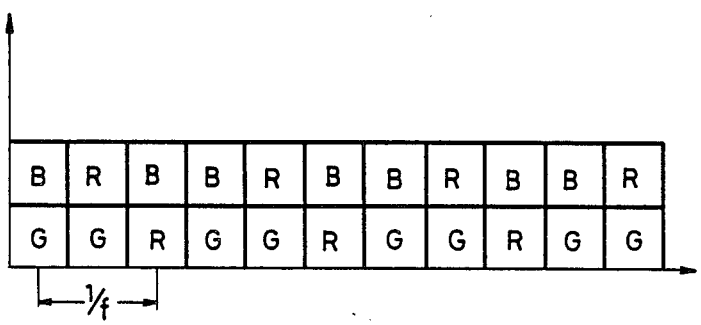
FIG. 8 is the graph schematically showing adding of the signals of FIG. 5(A) and FIG. 5(B).
Figure 9:
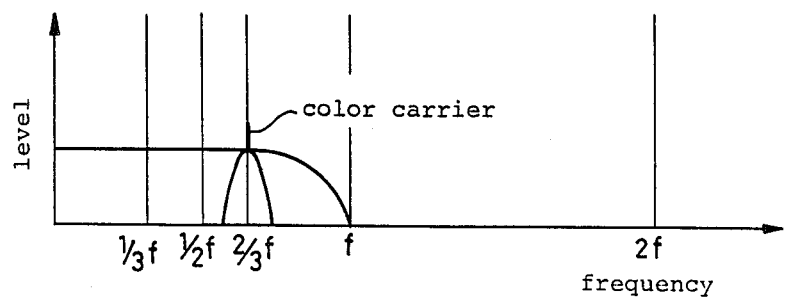
FIG. 9 is the spectral graph showing signals of FIG. 8.
Figure 10:
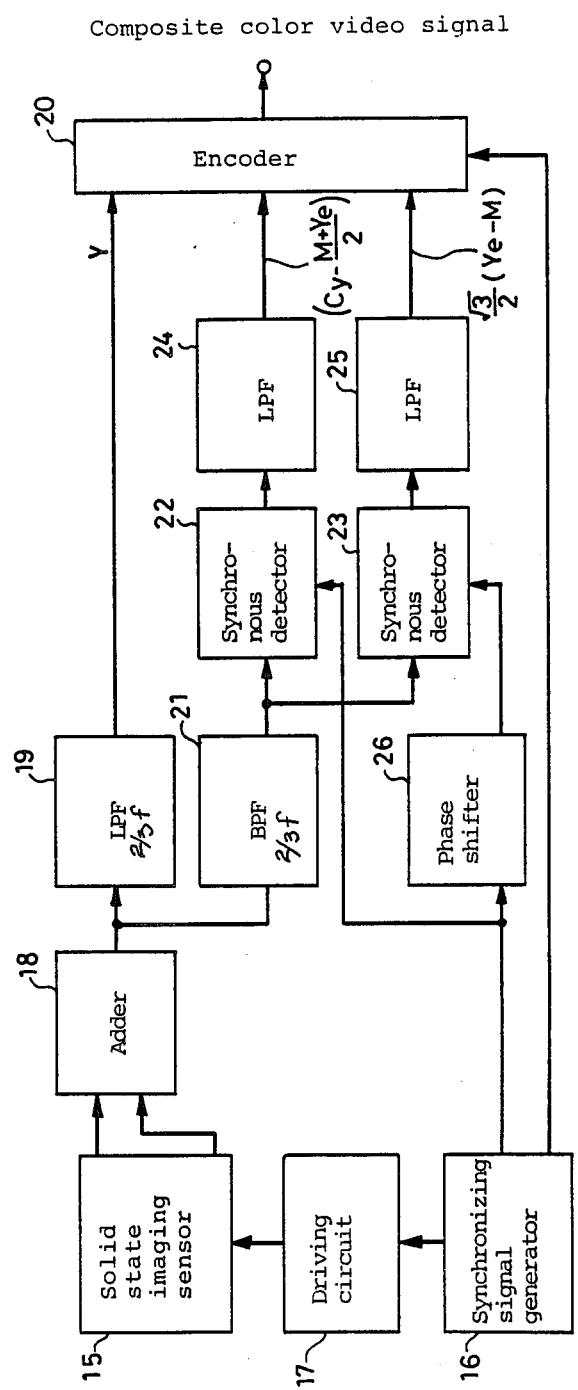
FIG. 10 is the overall circuit diagram of the prior art color solid state imaging apparatus of FIG. 3 and FIG. 4.
Figure 16:
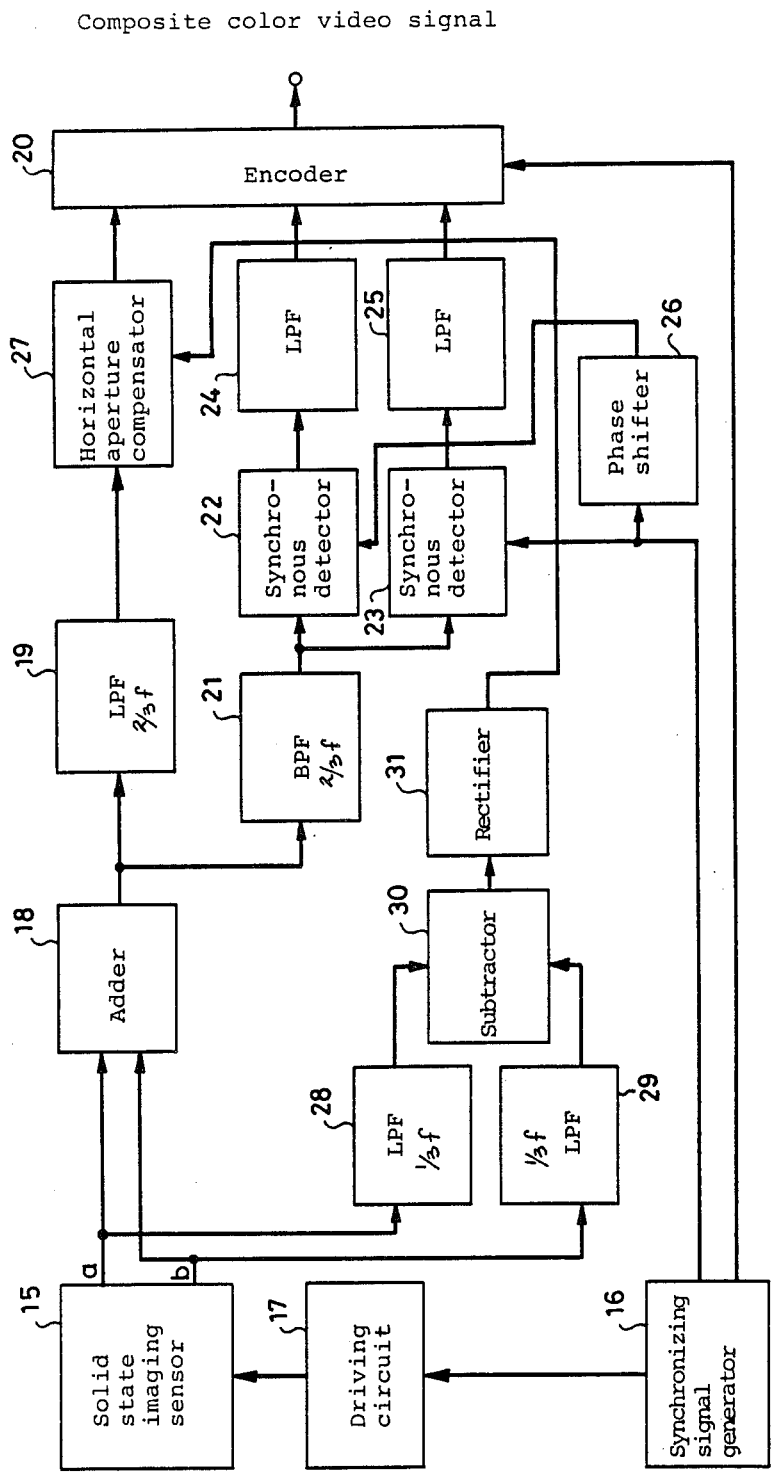
FIG. 16 is a circuit diagram of a first embodiment in accordance with the present invention.

A first embodiment is shown in FIG. 16, wherein the component circuits 15 to 26 are substantially similar to those of FIG. 10, and the same descriptions apply, and therefore descriptions are omitted here. The circuit of FIG. 16 further comprises low pass filters 28 and 29, which are for receiving two output signals from the output parts 11a and 11a' shown in the circuit of FIG. 3, and a subtraction circuit 30 for producing differences of the signals from the low pass filters 28 and 29 which are a pole frequency of $\frac{1}{2}f$. The output of the subtracting circuit 30 is supplied to a full wave rectifier circuit 31, to thereby obtain a signal having a same polarity. The signal indicates the largeness of the vertical correlation. The signal becomes large when the vertical correlation is small and the signal becomes small when the vertical correlation is large. The output signal of the low pass filter 19 is supplied to the control terminal of the horizontal aperture compensation circuit 27 to thereby control a size of the high frequency component based on the signal.

That is, the high frequency component becomes smaller as the control signal is supplied to the control terminal, and the high frequency component becomes larger as the control signal supplied to the control terminal increases. This means that the band of the luminance signal is controlled. The color TV signal is obtained by supplying the above luminance signal to the encoder 20.

Figure 17:
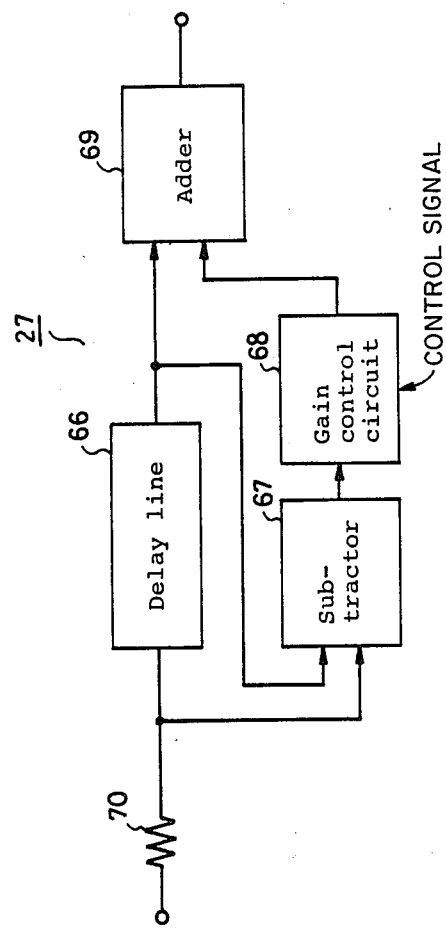
FIG. 17 is a circuit diagram of a part of the circuit of FIG. 16.

FIG. 17 shows one example of circuit configuration of a the horizontal aperture compensation circuit. The circuit shown in FIG. 17 utilizes a delay line 66 as delay means, and an output of the delay line 66 together with the input of the delay line 66 are both input to a subtracting circuit 67, an output of which is given to a gain control circuit 68, and both outputs of the delay line 66 and the gain control circuit 68 are added together in an adder 69. Normal 70 designates a resistor. In this circuit, the amplitude of the horizontal aperture compensation signal from the subtracting circuit 67 is controlled by the gain control circuit 68 and the amplitude level for adding to the luminance signal, namely the level of the signal to be input to the adder 69 is controlled thereby. And thus, in the actual circuit the signal level of the horizontal aperture compensation signal is lowered based on the output of the rectifier circuit 31 of FIG. 16, that is when vertical correlation of the objective image is weak.

Figure 11:
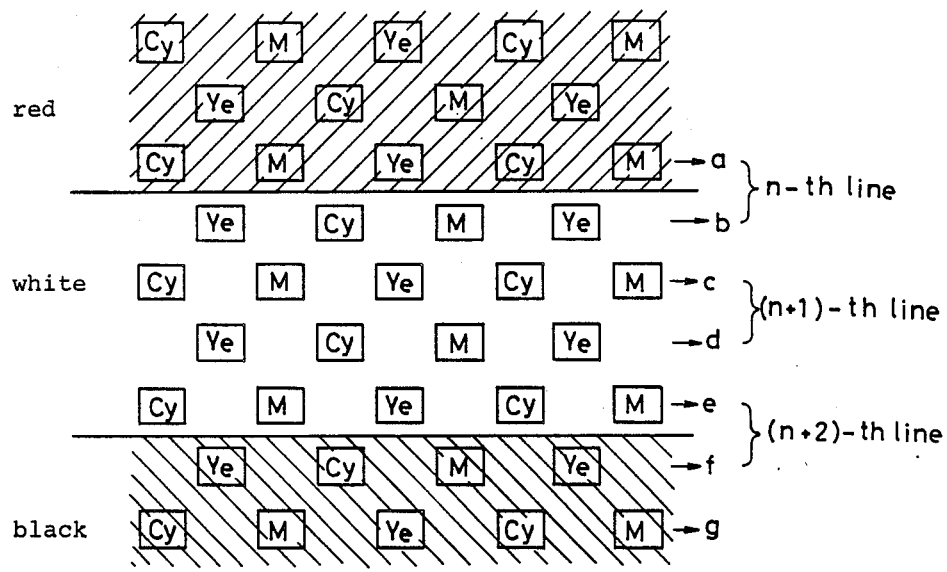
FIG. 11 shows the relationship of the object, the solid state imaging element of FIG. 3 and the color filter of FIG. 4 when an object having small vertical correlation is photographed.
Figure 13:
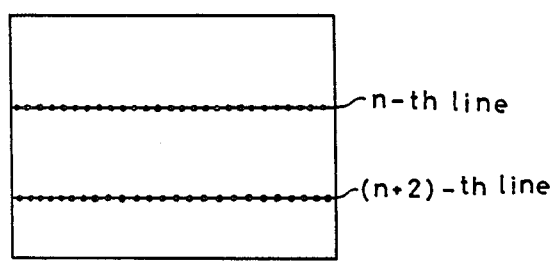
FIG. 13 is the front view of the image reproduced on the television monitor when the object of FIG. 11 is picked up.
Figure 12A:
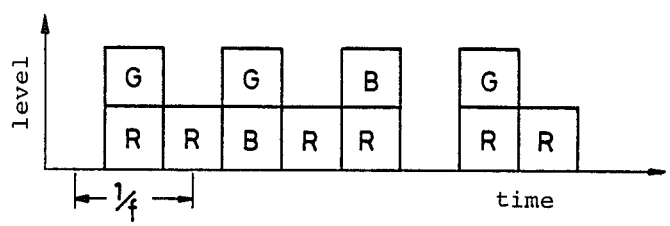
FIG. 12(A), FIG. 12(B) and FIG. 12(C) are the graphs showing the output signals of the adder 18 of the circuit of FIG. 10 when the object of FIG. 11 is photographed.
Figure 12B:
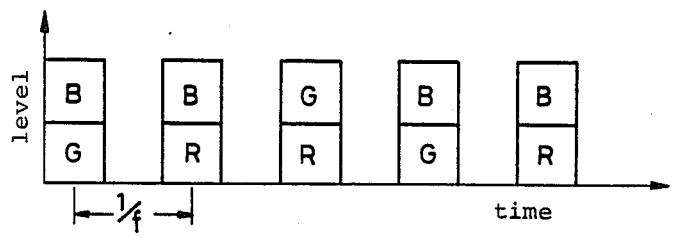
Figure 12C:
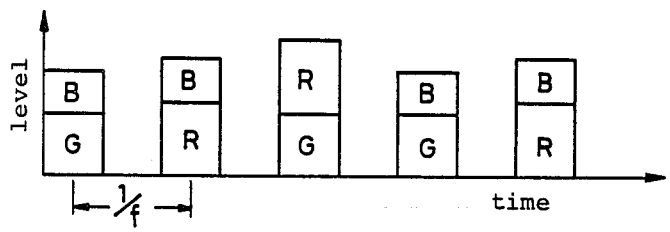
Figure 12D:
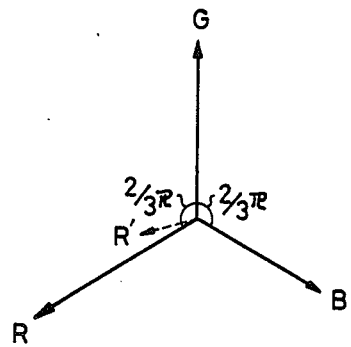
FIG. 12(D) is a vector diagram thereof.
Figure 14:
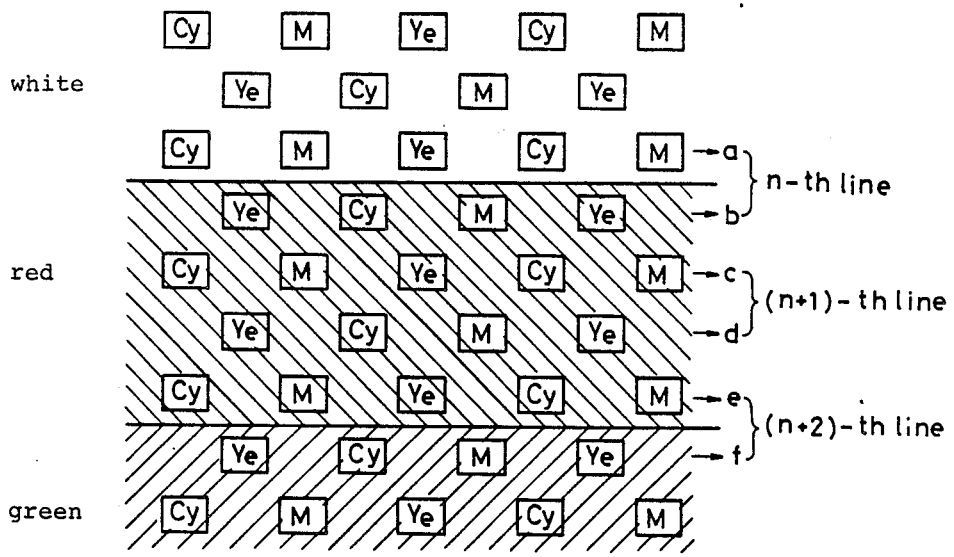
FIG. 14 is the partial front view of the relative disposition of the image and photodiodes with color filters including the parts where no vertical correlation of horizontal signals exist.
Figure 15A:
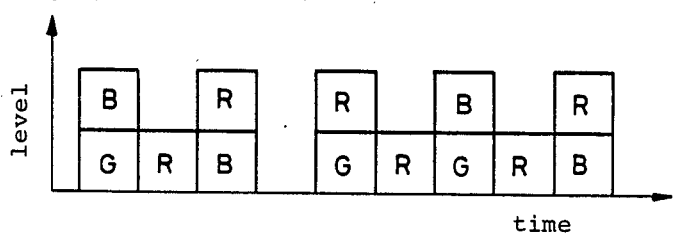
FIG. 15(A) and FIG. 15(B) are the graphs showing output signals of the adder 18 of FIG. 10 when the objective image of FIG. 14 is picked up.
Figure 15B:
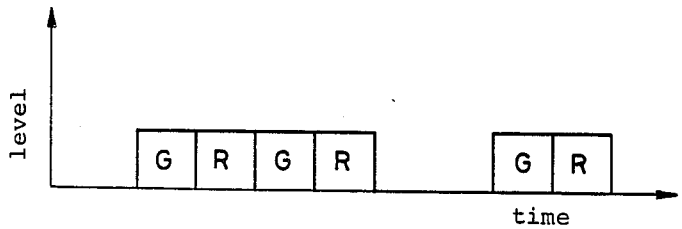

Nextly, an operation when an objective image which has a part where there is no vertical correlation as shown in FIG. 11 is described.

Provided that low frequency components of the upper line a and the lower line b of the n-th horizontal scanning of a line of FIG. 11 are denoted SaL and SbL, respectively, they can be expressed as follows:

$$\left. \begin{array}{rl} SaL &= 2R \\ SbL &= 2G + 2R + 2B \end{array} \right\} \quad (3)$$

Accordingly, by obtaining a difference between these two signals the following line difference signal SaL−SbL is obtainable:

$$\begin{aligned} SaL - SbL &= (2R) - (2G + 2R + 2B) \\ &= -(2G + 2B) \end{aligned} \quad (4)$$

In the similar way, provided that low range components of the upper line e and the lower line f of the (n+2)-th horizontal scanning of line of FIG. 11 are SeL and SfL, respectively, they can be expressed as follows:

$$\left. \begin{array}{rl} SeL &= 2G + 2R + 2B \\ SfL &= 0 \end{array} \right\} \quad (5)$$

Accordingly by obtaining a difference between these two signals, the following line difference signal SeL−SfL is obtainable.

$$\left. \begin{array}{rl} SeL - SfL &= (2G + 2R + 2B) - 0 \\ &= 2G + 2R + 2B \end{array} \right\} \quad (6)$$

Similarly as the above-mentioned, the line difference signals may become positive or negative. Accordingly they are processed by a full-wave rectifier to produce a control signal of a predetermined polarity.

Thus in this first embodiment circuit, by detecting a difference signal between the low frequency components of the simultaneously produced signals to produce a control signal, the horizontal aperture compensation is made responsive to the vertical correlation of the objective image. Therefore, an undesirable interference signal generated at $\frac{1}{2}f$ frequency is substantially decreased. In a TV pick up apparatus, compensation frequency of the horizontal aperture compensation circuit is selected to be 2–3 MHz in view of experimental data regarding sensitivity of human eyes. Since the interference signal produced in the solid state imaging apparatus for using the present apparatus has a $\frac{1}{2}f$ at about 2.44 MHz, the dot noise can be removed by decreasing the horizontal aperture compensation.

Figure 18:
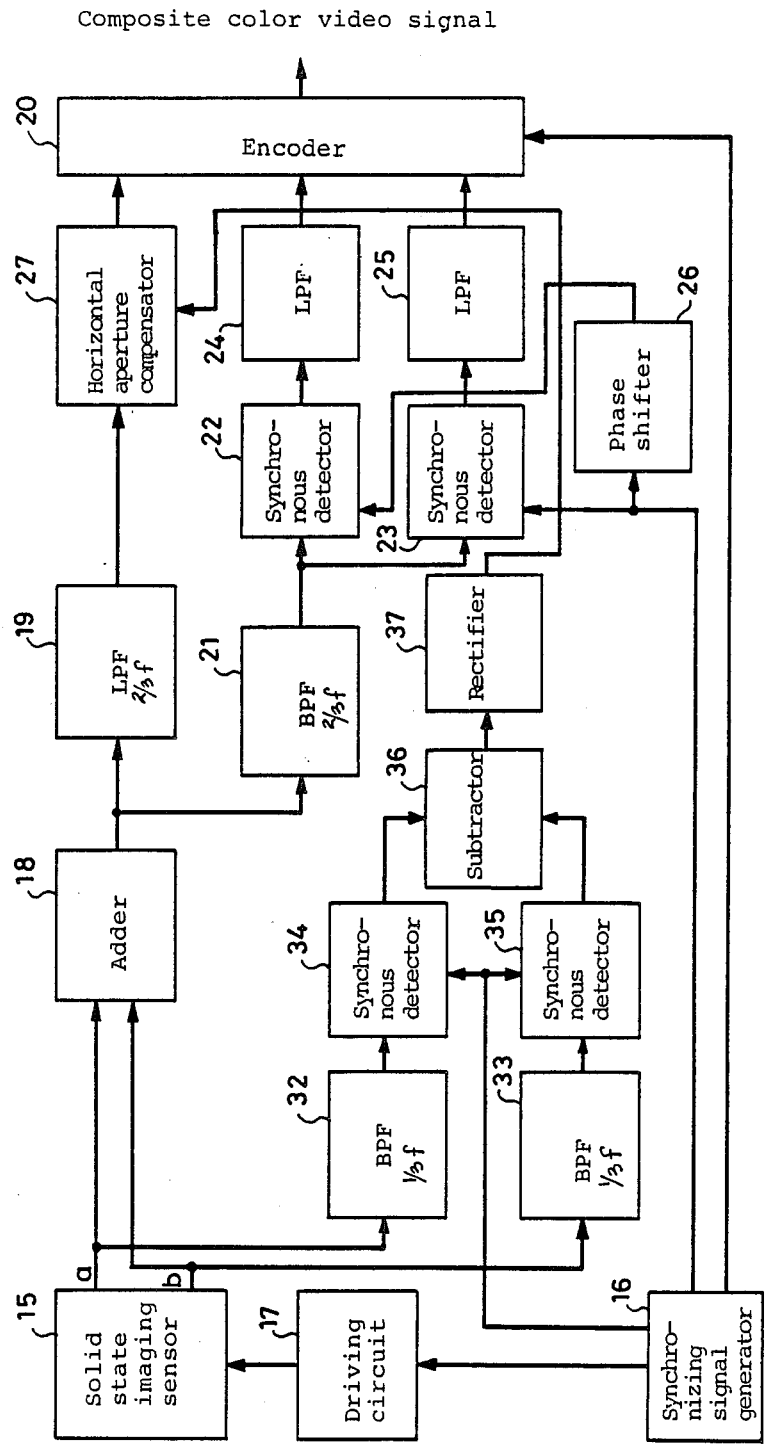
FIG. 18, FIG. 19, FIG. 20, FIG. 21 and FIG. 22 are circuit block diagrams of a second, a third, a fourth, a fifth and a sixth embodiments of the present invention.

FIG. 18 shows a second embodiment of the invention. Component circuits designated by numerals 15–27 are substantially identical to those of the first embodiment and the same descriptions apply. Accordingly, a superposed description thereof is omitted. In this second example, band pass filters 32 and 33 are provided, both having a center frequency of $\frac{1}{2}f$, and input terminals thereof are connected to the output parts 11a and 11a' of the circuit of FIG. 3. An output terminal thereof is connected to synchronous detectors 34 and 35, and output terminal of the synchronous detectors 34 and 35 are connected to the input terminals of a subtractor 36. Then the output signal of the subtractor 36 is given to a rectifier 37 similar to the first example of FIG. 16. Accordingly, the simultaneously read-out two output signals are lead through the band pass filters 32 and 33 to separate modulated chrominance signals, which are then given to the synchronized detector 34 and 35, wherein the modulated chrominance signals are detected by utilizing synchronization detection difference signal from the synchronizing signal generator 16. Then, the detected signals are given to the subtractor 36 where a difference of the two signals is produced and the output is rectified by the rectifier 37 to produce a signal of a predetermined polarity. The rectified signal is given to the horizontal aperture compensation circuit 27. In the actual circuit, there should be a low pass filter to limit signal frequency band between the synchronization detectors 34, 35 and subtractor 36 or between the subtractor 36 and the rectifier 37, but it is omitted in the drawing for simplicity of description and drawing. The synchronization detection reference signal from the synchronizing signal generator 16 can be produced by dividing the frequency of the horizontal transfer clock signal into a ⅓ frequency. In the circuit of this second embodiment, the subtracted difference signal between two color difference signals are rectified and used to control the horizontal aperture compensation circuit 27, to thereby control amount of horizontal aperture compensation responding to the level of the subtraction signal. That is, when the subtracted signal level is high, the horizontal aperture compensation signal level is lowered to decrease level of interference signal in the luminance signal.

Operation when no vertical correlation of the objective image exists as shown in FIG. 11 is described.

Provided that low frequency components of the upper line a and the lower line b of the n-th horizontal scanning of line of FIG. 11 taken out by passing through the band-pass filters 32 and 33 Sa and Sb, respectively, they can be expressed as follows:

However, when using actual signals, color carriers of two lines a and b of the simultaneously read horizontal lines differ from each other by 180°, and an adder is used instead of the subtracter 36.

The above-mentioned first embodiment may encounter such an occasion that two color difference signals have sufficient level differences but two chrominance signals have an insufficient level difference. Therefore the controlling of the horizontal aperture compensation is not sufficient. On the other hand, in the second embodiment, there may be such problem that two color difference signals have insufficient level difference while two luminance signals have a sufficient level difference. Accordingly a further improved circuit is devised as shown in the third embodiment of FIG. 19.

Figure 19:
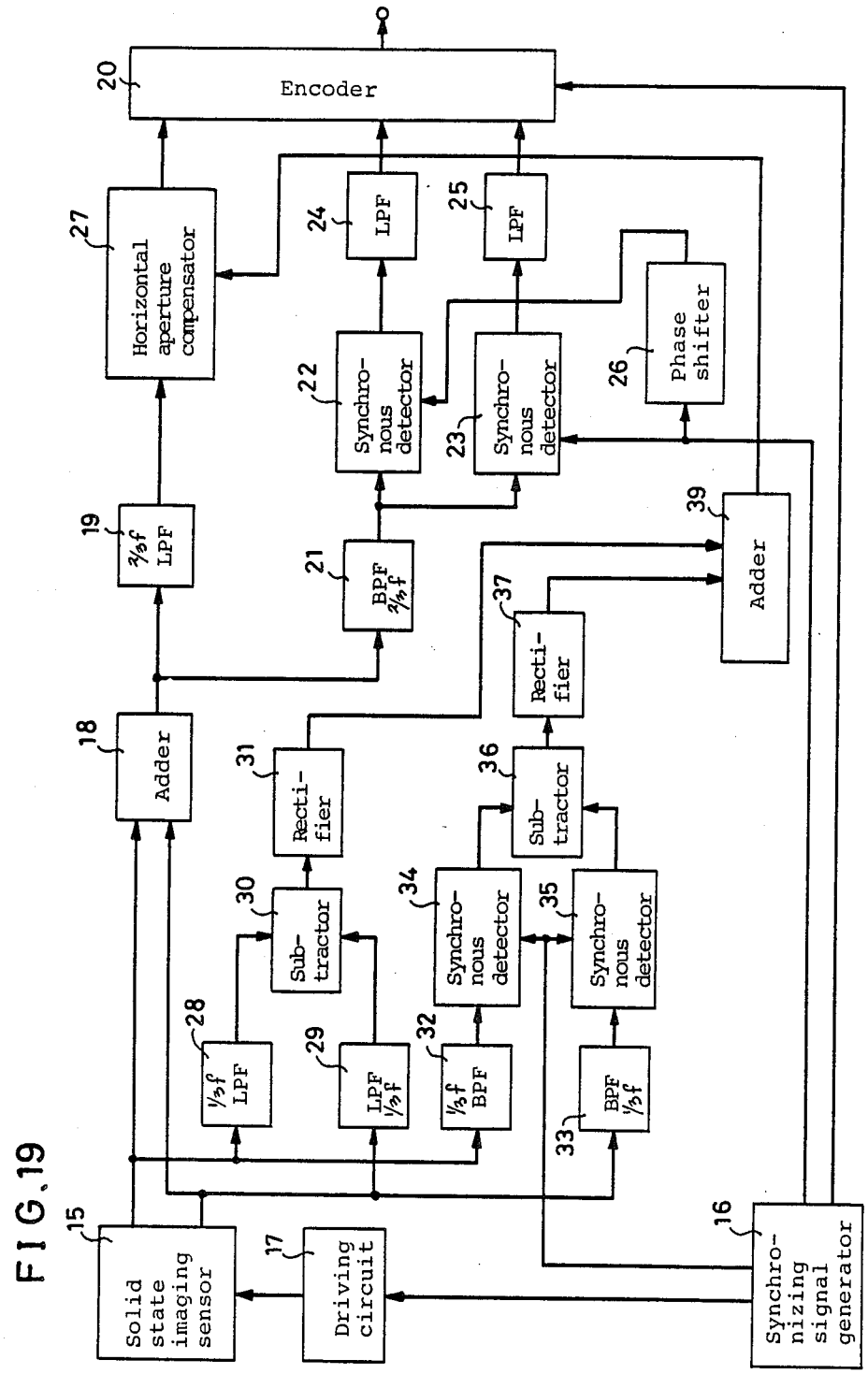

FIG. 19 shows a third example which is an improvement over the first and the second embodiments. The component circuits 15–37 are substantially the same as those of the first and second embodiment and the same description apply, accordingly superposed descriptions thereof are omitted. In this third embodiment, both output signals from the first rectifier 31 and the second rectifier 37 are given to an adder 39, and as the control signal further given to the horizontal aperture compensation circuit 27. Accordingly, even when the two color difference signals have a poor level difference, or when the two luminance signals have a poor level difference inbetween, a satisfactory control performance is obtained.

Figure 20:
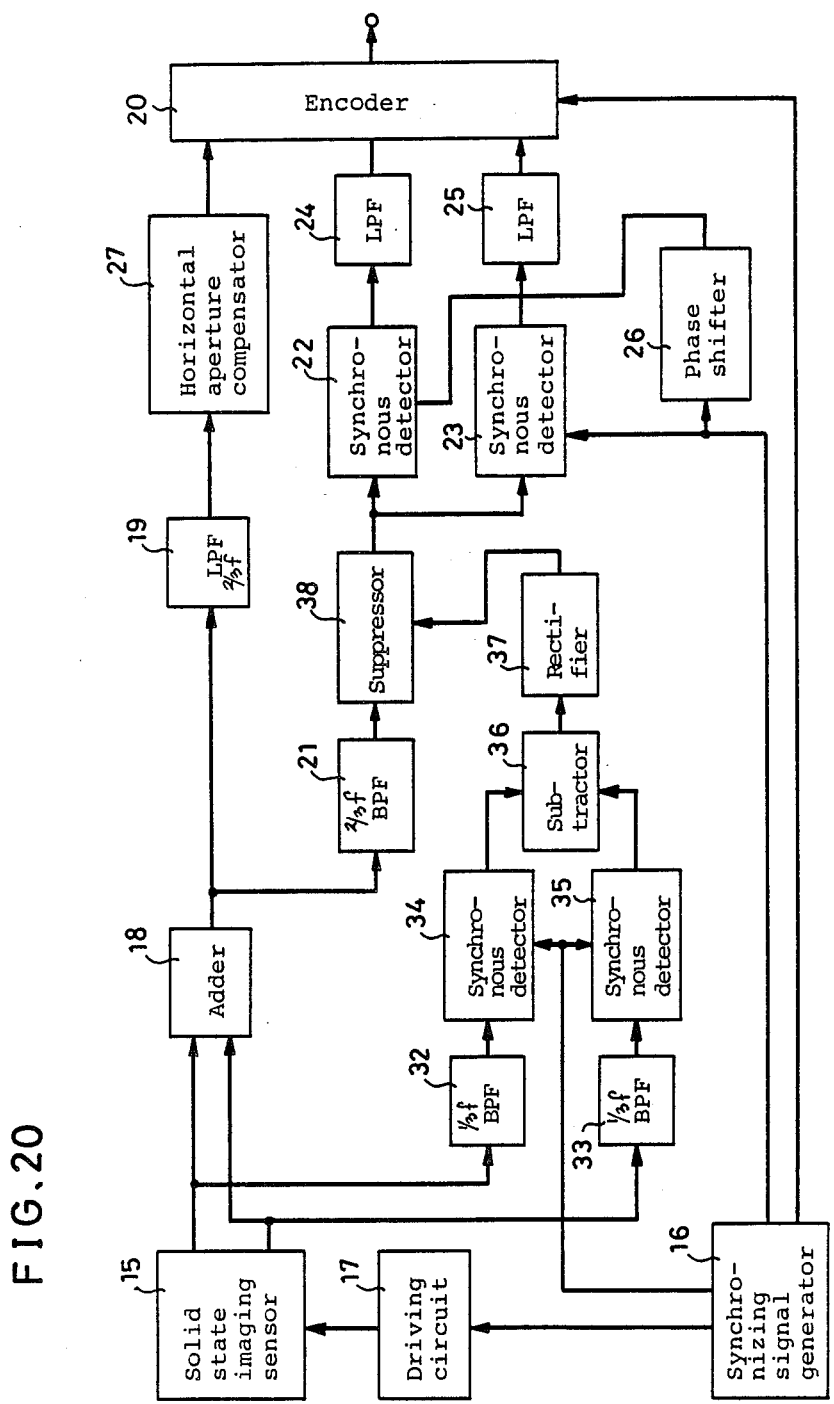

FIG. 20 is a circuit block diagram of a fourth embodiment. In this embodiment, when vertical correlation of a chrominance signal of some horizontal line part of objective image is small, spurious chrominance signals to be generated at vertically changing parts of an objective image are removed. The circuit of FIG. 20 is started from the circuit of FIG. 18, and circuit components designated by numerals 15–37 are substantially identical to those described with reference to FIG. 18. Therefore, superposed descriptions thereof are omitted here. The circuit of FIG. 20 further comprises a suppressor 38 for suppressing a color signal between the band pass filter 21 and the synchronous detectors 22 and $$Sa = K_1 \left\{ Cy \sin \omega t + M \sin \left( \omega t + \frac{2}{3} \pi \right) + Ye \sin \left( \omega t + \frac{4}{3} \pi \right) \right\} = K_1 R \sin \omega t$$

$$Sb = K_2 \left\{ Ye \sin \omega t + Cy \sin \left( \omega t + \frac{2}{3} \pi \right) + M \sin \left( \omega t + \frac{4}{3} \pi \right) \right\} = 0$$

(7)

When the modulated chrominance signals 7 are synchronization-detected by utilizing the reference signal of sin ωt, then the resultant chrominance signals Sa' and Sb' are as follows:

$$Sa' = -K_1 R$$
$$Sb' = 0$$

(8)

Therefore, by obtaining the subtraction result between these color difference signals and by rectifying a full-wave rectifier, the control signal for use in the horizontal aperture compensation circuit 27 is produced.

For simplicity of the explanation, the subtractor 36 of FIG. 18 has been described as a subtraction circuit.

23. The suppressor 38 for color signal receives control signal from the rectifier circuit 37 and controls a modulated chrominance signal of ⅔f from the band pass filter 21, in a manner that when the control signal is provided from the rectifier circuit 37 to suppress the transmission of the ⅔f modulated chrominance signal from the band pass filter 21 to the synchronous detectors 22 and 23, the spurious chrominance signal is substantially eliminated when vertical correlation is small.

Nextly, operation of the present embodiment of FIG. 20 is described for the case where vertical correlation of the color signal does not exist. Modulated chrominance signals Se and Sf which are obtained by signals e and f of (n+2)-th horizontal line through band pass filters 32 and 33 are expressed as follows:

$$Se = K_1\left(Cy \sin \omega t + M \sin\left(\omega t + \frac{2}{3}\pi\right) + Ye \sin\left(\omega t + \frac{4}{3}\pi\right)\right)$$

$$= K_1 R \sin \omega t$$

$$Sf = K_2\left(Ye \sin \omega t + Cy \sin\left(\omega t + \frac{2}{3}\pi\right) + M \sin\left(\omega t + \frac{4}{3}\pi\right)\right)$$

$$= K_2 \cdot \frac{G}{2} \sin \omega t + K_2 \cdot \frac{\sqrt{3}}{2} G \cos \omega t$$

(9)

where $M = R + B$, $Cy = G + B$, $Ye = R + G$ and $\sin \omega t = \sin 2\pi \cdot \frac{1}{3} f \cdot t$.

The modulated chrominance signals are then detected by synchronized detection utilizing a reference signal of sin ωt, to produce detected color difference signals Se' and Sf' as follows:

$$Se' = K_1 R$$
$$Sf' = \frac{1}{2} K_2 G$$

(10)

Then, by subtracting these color difference signals from each other, and thereafter rectifying by using a full-wave rectifier 37, a control signal is obtainable.

As has been described, the circuit of this embodiment includes means to obtain a difference between two color difference signals based on simultaneously read-out two signals of two lines, thereby to produce control signal to remove a spurious chrominance signal produced at the vertical change parts of color of objective image therewith.

Figure 21:
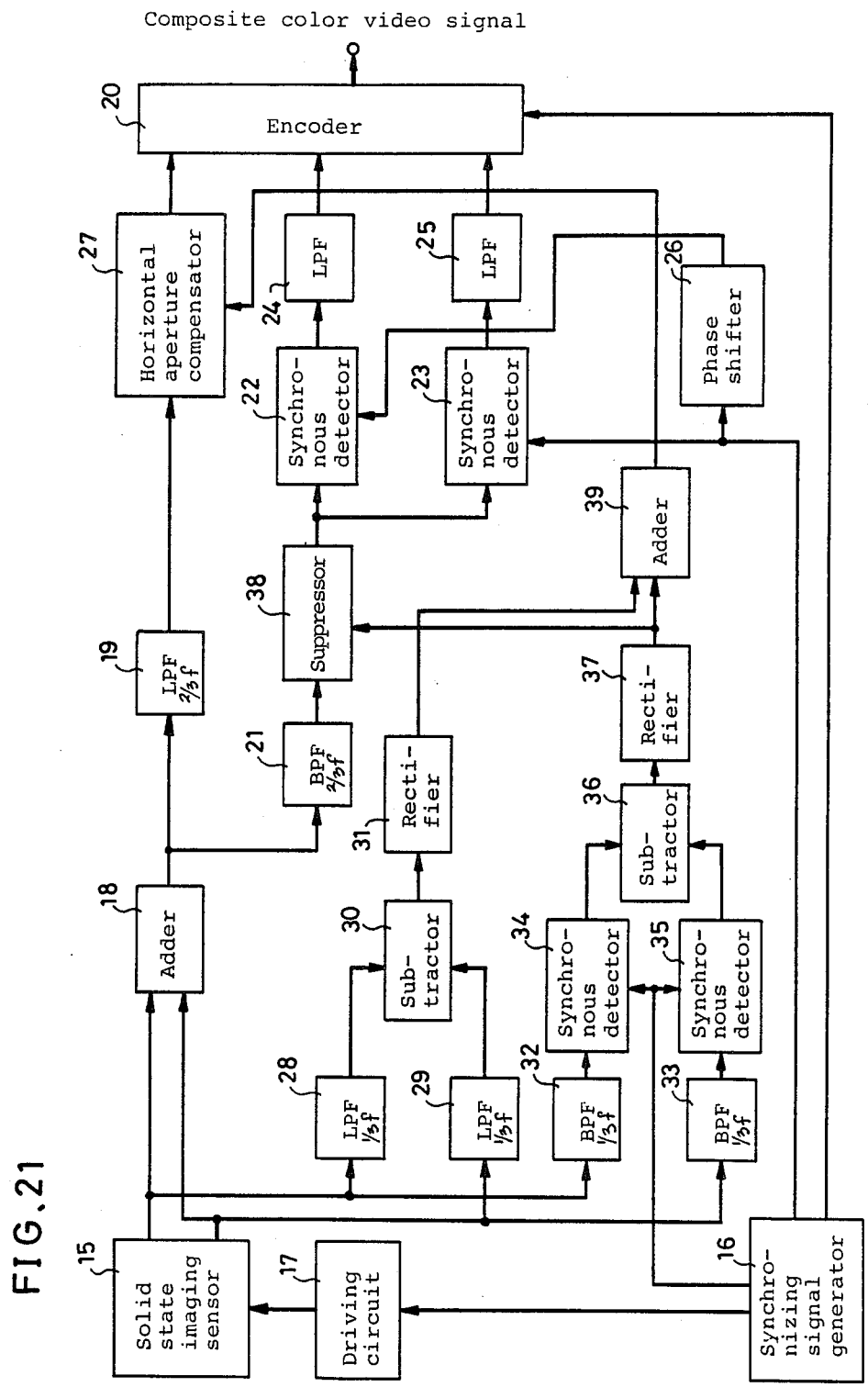

FIG. 21 shows a fifth embodiment wherein both features of the embodiments of FIG. 19 and FIG. 20 are utilized. Therefore, the fifth embodiment of FIG. 21 has both of the improved features of the embodiments of FIG. 19 and of FIG. 20, and no repeated description thereof are omitted herewith for simplicity's sake.

Figure 22:
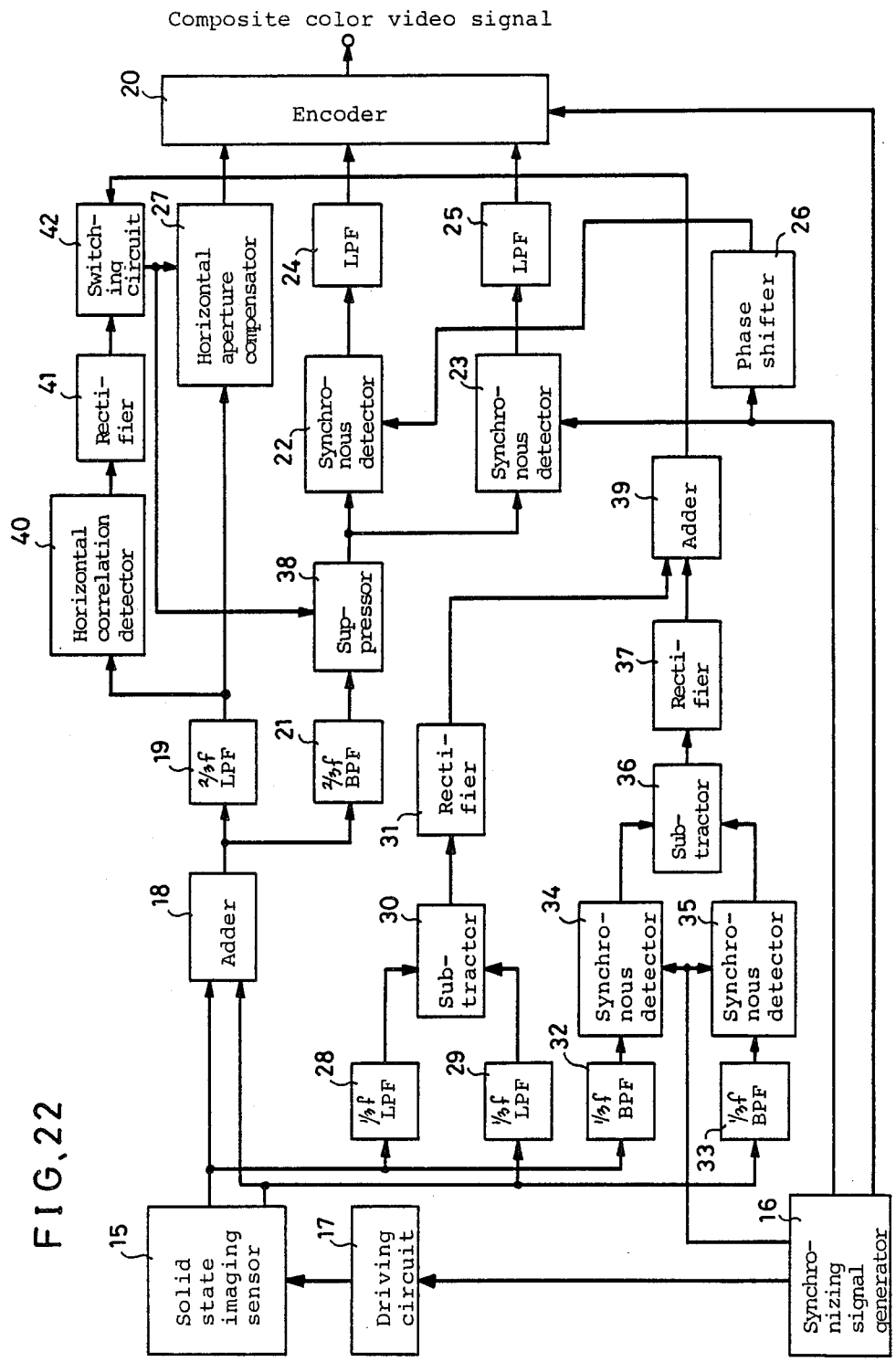

FIG. 22 shows a sixth embodiment which is directed to problems in the case where the objective image has horizontal correlations.

In the sixth embodiment of FIG. 22, the component circuits designated by numerals 15–39 are substantially identical to those of the fifth embodiment, and so, repeated descriptions are omitted. The circuit of FIG. 22 further has a horizontal correlation detector 40 to receive the output signal of the low pass filter 19, and the output signal of the horizontal correlation detector 40 is provided through a rectifier 41 to a switching circuit 42. Accordingly the horizontal correlation detector 40 receives the luminance signal from which an unnecessary high frequency component has been removed.

Figure 25:
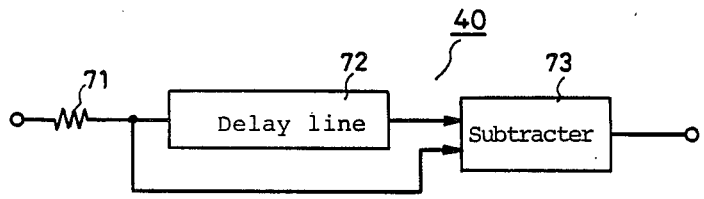
FIG. 25 is a partial circuit diagram of the circuit for detecting horizontal edge part of luminance signal.

The horizontal correlation detector 40 is constituted, for instance, as shown by FIG. 25. That is, the horizontal correlation detector 40 comprises an delay line 72, an input terminal matching resistance 71 and a subtractor as shown in FIG. 25.

The horizontal correlation of the luminance signal is detected and the horizontal correlation signal is obtained by comparing the signals at the input and output terminals of the signal delay 72. The delay time of the signal delay line 72 is selected to be longer than that of the delay line 66 used in the horizontal aperture compensation circuit 27, in order that the frequency band width of the horizontal correlation signal is wider than that of horizontal aperture compensation signal.

The obtained signal indicative of horizontal correlation of the luminance signal is fed to a rectifier 41 which rectifies the correlation signal to produce the horizontal correlation signal to a single polarity. Then, the horizontal correlation signal is fed to a switching circuit 42, which passes control signal of horizontal aperture compensation value from adder 39 when the horizontal correlation signal is zero, and cutoff the control signal when the horizontal correlation signal is not zero.

Figure 23:
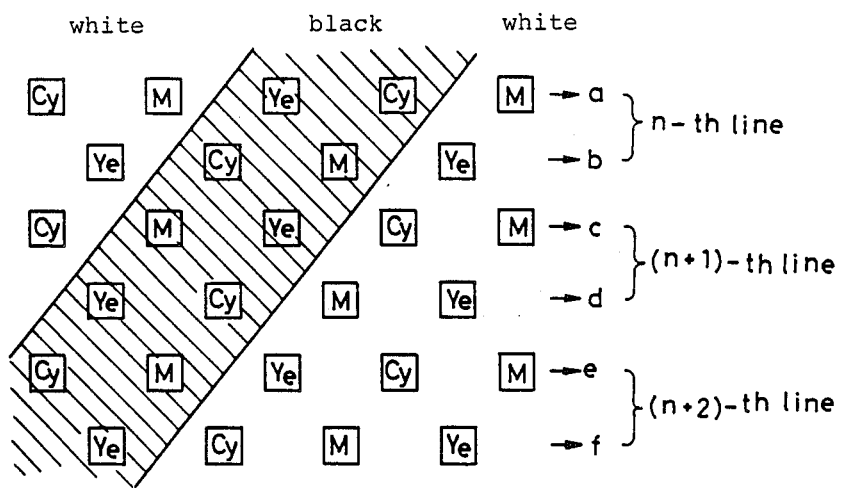
FIG. 23 is a front view showing relative disposition of an object and photodiodes with color filters in the present invention.

As shown in FIG. 23, when the object which is oblique to the horizontal scanning direction is photographed, fe represents the central frequency of the horizontal aperture control signal obtained by the full-wave rectification of the difference signal of the low frequency signal of the two simultaneously read out horizontal line output signals and the fs represents the central frequency which is boosted in the horizontal aperture compensation signal.

Figure 24:
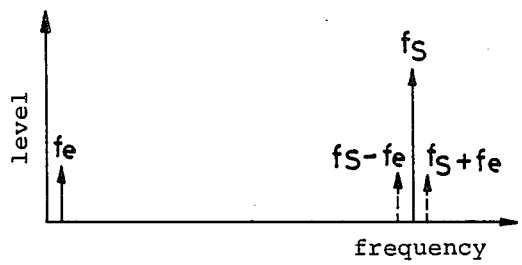
FIG. 24 is a spectral graph when the object shown in FIG. 23 is picked up.

The band of the luminance signal is controlled by supplying the two signals to the horizontal aperture compensation circuit 27, and thereby to produce the side band component fs+/−fe around fs as shown in FIG. 24.

The horizontal aperture compensation circuit 27 comprises the gain control circuit 68 as shown in FIG. 17 and the two signals of fe and fs are multiplied in the circuit. In the aforementioned fifth embodiment of FIG. 21, gain control of amplitude of the compensation signal of horizontal aperture compensation circuit 27 is made by utilizing the control signal, and in such a configuration there are liabilities of production of side bands of $f_s \pm f_e$ frequency as a result of producing of two signals with two different frequency components, and of frequency conversion of noises of the control signal, to deteriorate image quality. Such shortcomings are eliminated by an the present sixth embodiment of FIG. 22, by operation in the control circuit. In this operation horizontal correlation of the luminance signal and the cutoff horizontal aperture control signal which is fed to the horizontal aperture compensation circuit 27 at a horizontal edge part of little or no horizontal correlation, thereby to stop the control of horizontal aperture compensation signal.

Figure 26:
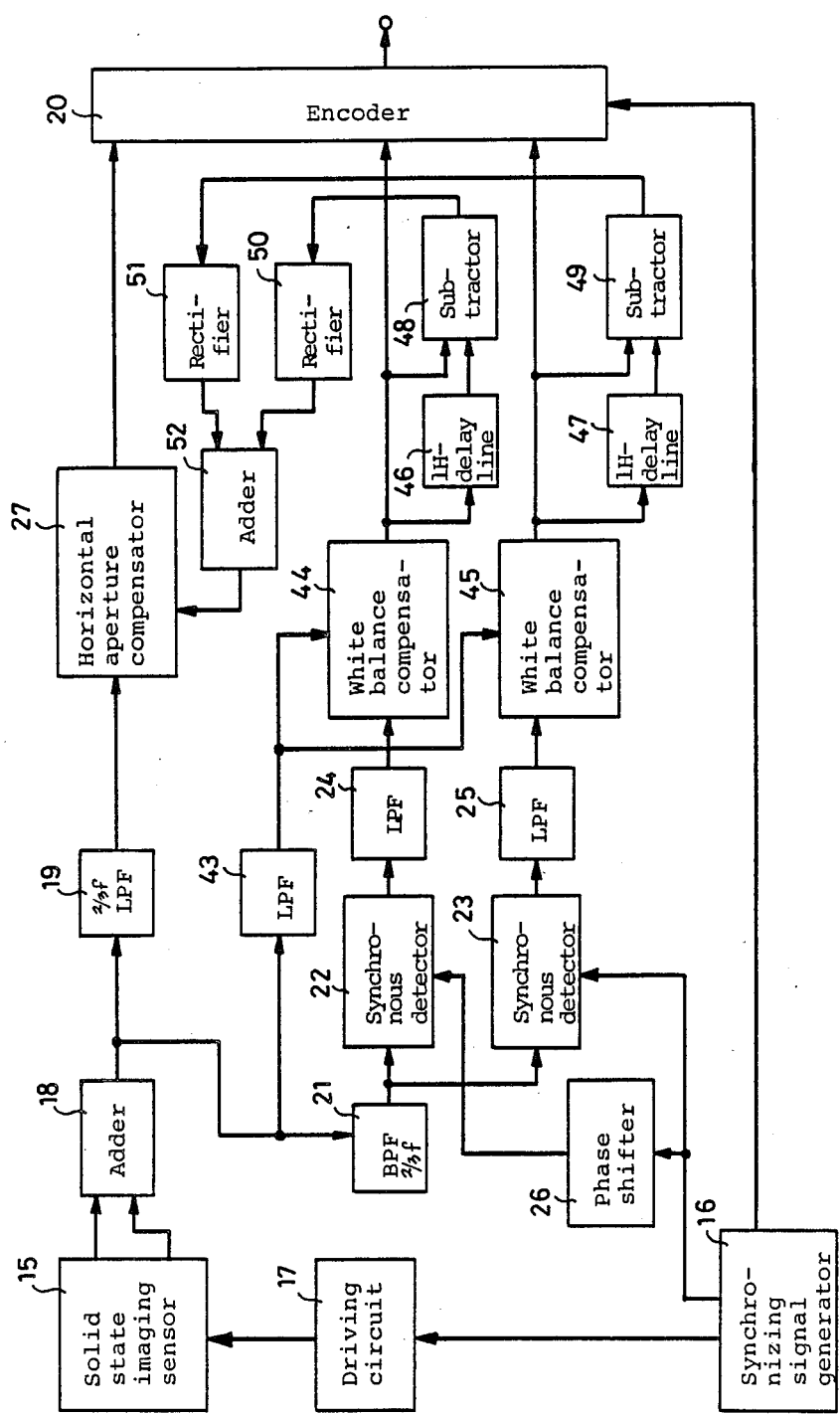
FIG. 26, FIG. 27, FIG. 28, FIG. 29, FIG. 30 and FIG. 31 are circuit block diagrams of a seventh, an eighth, a ninth, a tenth, an eleventh and a twelfth embodiments of the present invention.

FIG. 26 shows a seventh embodiment in accordance with the present invention. In the circuit block diagram of FIG. 26, numerals 15–27 designate the components and parts substantially identical to those of the above-mentioned sixth embodiment and superposed description thereof is omitted here. The embodiment of FIG. 26, has besides the components and parts shown in the embodiment of FIG. 22, low pass filter 43, connected to the output terminal of the circuit 18, and white balance compensation circuits 44 and 45 to receive outputs of the low pass filter 43. The output signal of the white balance compensation circuit 44 and 45 are given, directly and through 1H-delay lines 46 and 47, to subtracters 48 and 49. The outputs of the subtracters 48 and 49 are provided through rectifiers 50 and 51 to an adder 52, the output of which is given to the horizontal aperture compensation circuit 27.

A pair of color difference signals produced by passing the output signals of the synchronous detectors 22 and 23 through low pass filters 24 and 25, respectively are fed to the white balance compensation circuits 44 and 45. The white balance compensation circuits 44 and 45 also receive luminance signals having the same signal band width as the color difference signals through the low pass filter 43, by adding or subtracting color difference signals and luminance signals to compensate white balance of color difference signals, when the color temperature of light source illuminating the objective image change, thereby to stabilize the white balance of the color difference signals. The color difference signals which have been compensated for white balance are fed to the encoder 20 and the 1H-delay lines 46 and 47, and the encoder 20 converts the color difference signals into chrominance signals. The 1H-delay lines feed color difference signals, which are delayed by one horizontal-line scanning period, to subtractor 48 and 49, which produce a difference signal between the delayed signal and non-delayed signal.

That is, the largeness of the vertical correlation of the object is detected by the largeness of the difference signal of the chrominance signal obtained by the horizontal scanning of the neighboring lines. When the vertical correlation is large, the difference signal is small and when the vertical correlation is small, the difference signal is large. Thereby, a difference signal between chrominance signals over a 2H period is produced to detect vertical correlation values of the objective image. The difference signals for the 2H period are fed to rectifiers 50 and 51, which then convert the full-wave difference signals into single polarity control signals, which are then fed to the adder 52. The adder 52 adds the control signals detected from the color difference signals, and feeds them to the horizontal aperture compensation circuit 27 to control horizontal aperture compensation value, responding to level of the control signal. That is, when the control signal level is high, that is when the vertical correlation of the objective image is small, the horizontal aperture compensation value is decreased. This is the equivalent of removing the ½f interference signal.

As has been described, the present embodiment can remove an interference signal produced in the luminance signal by utilizing vertical correlation of the objective image by using the color difference signal.

Vertical correlation of the objective image is detected by using color difference signals of two horizontal scanning period to thereby suppress a undesirable interference signal generated in the luminance signal.

Figure 27:
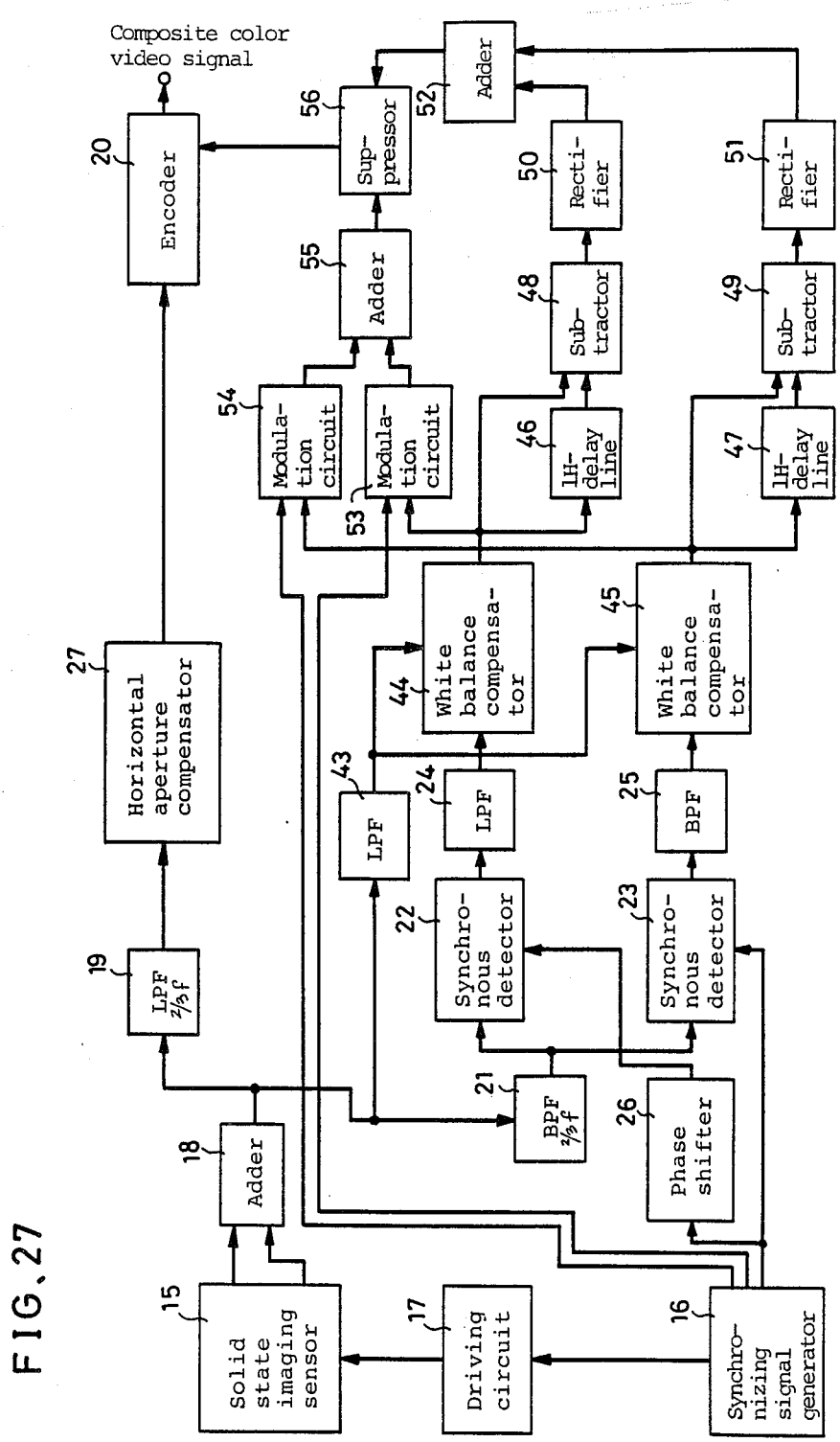

In the circuit block diagram of FIG. 27, components and parts 15–52 are substantially similar to those of the seventh embodiment. This eighth embodiment comprises modulation circuits 53 and 54, adder 55 and a suppressing circuit 56. In this circuit, two color difference signals from the white balance compensation circuit 44 and 45 are fed to the modulation circuits 53 and 54, respectively, which modulate the color difference signals by using carrier signals having a 90° phase difference between each other. The pair of modulated color difference signals are fed to the adder 55. The adder 55 sums the two chrominance signals and provides the resultant output as the chrominance signals to the encoder 20 through the suppressing circuit 56. The suppressing circuit 56 suppresses an amplitude of the chrominance signal fed from the adder 52.

When the control signal is not zero, that is when the vertical correlation of the objective image is zero or very small, the chrominance signal is suppressed and a spurious color signal is produced at the vertical color changing part of the objective image.

Figure 28:
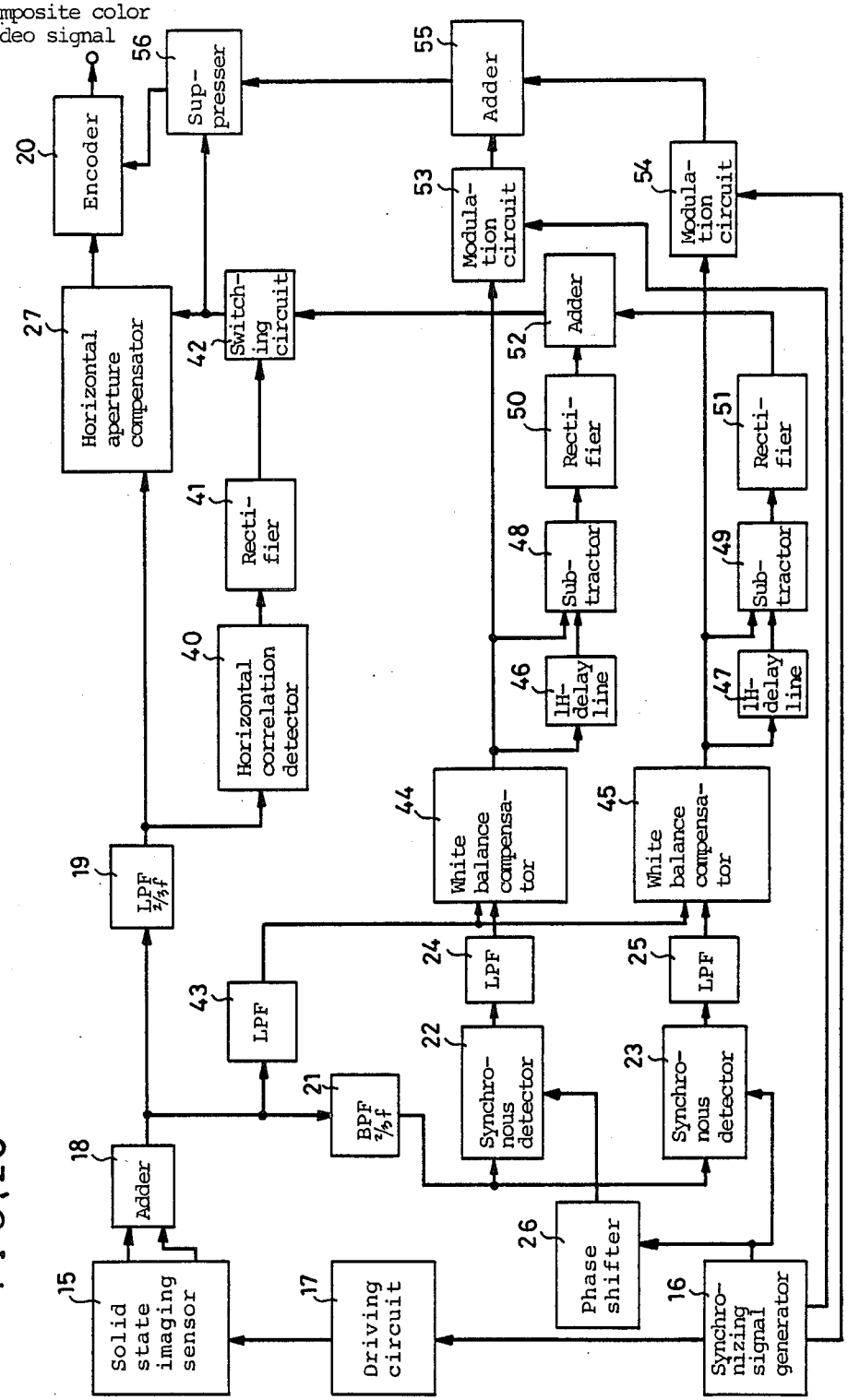

FIG. 28 is a circuit block diagram of a ninth embodiment, wherein features of the seventh embodiment and the eighth embodiment are combined and the control signal is also cut-off at the horizontal edge part of the luminance signal similarly to the sixth embodiment. Accordingly, the operations of the components and parts are similar as those described on the sixth embodiment, seventh embodiment and eighth embodiment.

Figure 29:
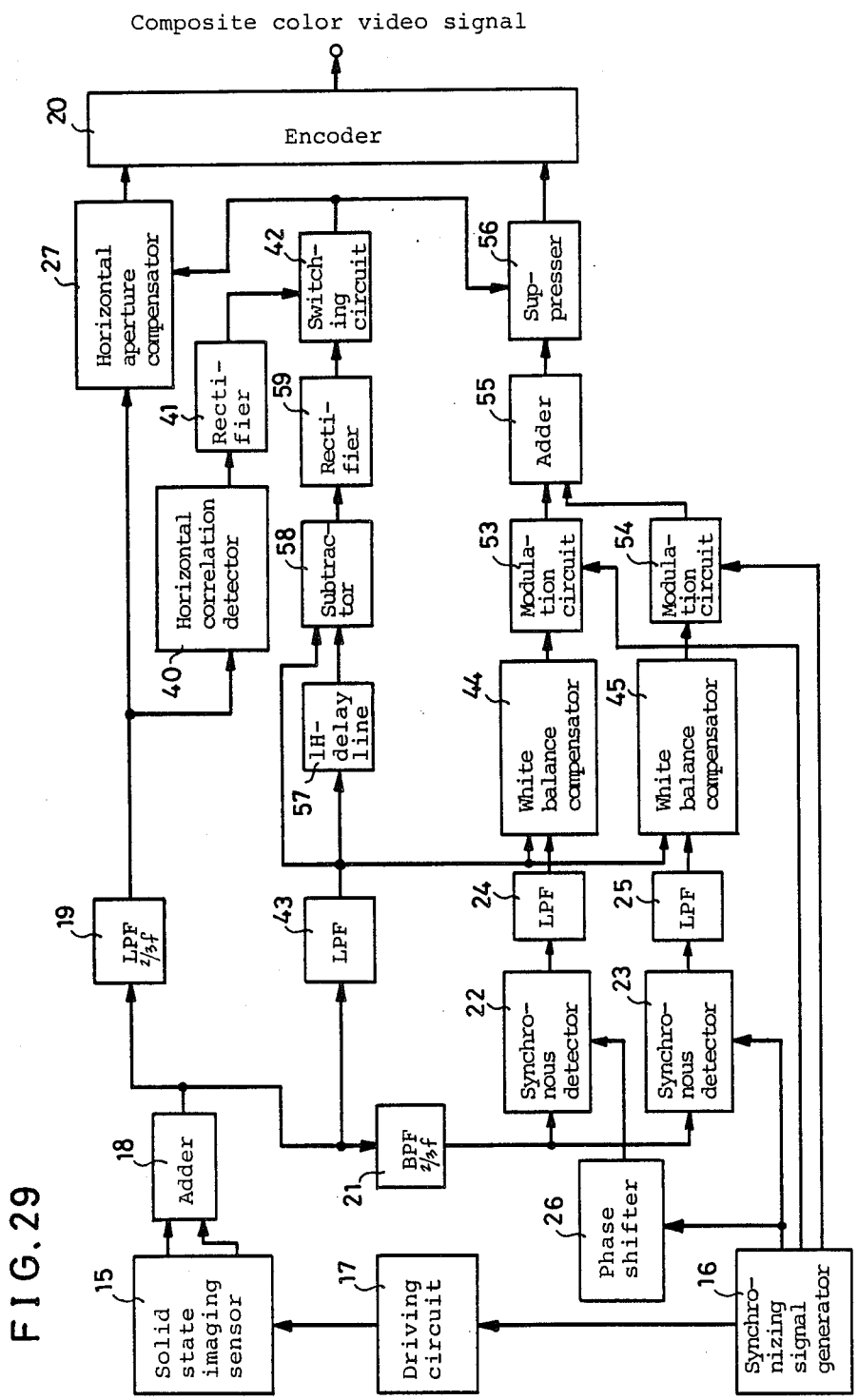

FIG. 29 is a circuit block diagram of a tenth embodiment. In the embodiment of FIG. 29, components and parts 15–56 are similar to those of the ninth embodiment. This tenth embodiment further has a 1H-delay line 57 and subtracter 58 and a rectifier 59. (where 1H means the time period of one horizontal scanning.) The luminance signal of narrow band width from the low pass filter 43 is fed to the 1H-delay line 57, to the subtracter 58, and further to a rectifier 59. The subtracter 58 performs a difference calculation between one luminance signal and the 1H-delayed luminance signal, thereby producing a difference signal for 2H-period, and feed it to the rectifier 59 in order to full-wave rectify this wave to produce a single polarity control signal to be fed to the switching circuit 42. The switching circuit 42 cuts out the control signal at the horizontal edge part of the objective image similarly to the sixth embodiment of FIG. 22, thereby allowing the control signal to pass except for the case of horizontal edge part, thereby feeding the control signal to the horizontal aperture compensation circuit 27 and suppressing circuit 56. Therefore, except for the horizontal edge part of the luminance signal, horizontal aperture compensation value is decreased responding to the level of the control signal, to remove interference on the luminance signal. The undesirable spurious chrominance signal at the vertical changing part of the color is also suppressed, responding to the level of the control signal, to remove the undesirable spurious chrominance signal.

As has been described, this embodiment attains elimination of undesirable interfering signals by detecting vertical correlation of objective image from the difference of chrominance signals for a 2H time period, and controlling the suppressing of horizontal aperture compensation value of horizontal signals and suppressing value of chrominance signal except for the horizontal luminance change part, to obtain a high quality image.

The solid state image sensor for use in the present invention has the feature that by simultaneously leading out signals of plural horizontal line of picture elements and by summing plural signals, the modulated color signals generated at the frequency of ½f are off-set, thereby producing a luminance signal of high resolution. However, when the objective image has a high color saturation, in the adder 18, common made rejection ratio is equivalently deteriorated, thereby allowing generation of an interference signal of the ½f within the band width of luminance signal. Such a shortcoming is eliminated by the below-mentioned eleventh embodiment of FIG. 30.

Figure 30:
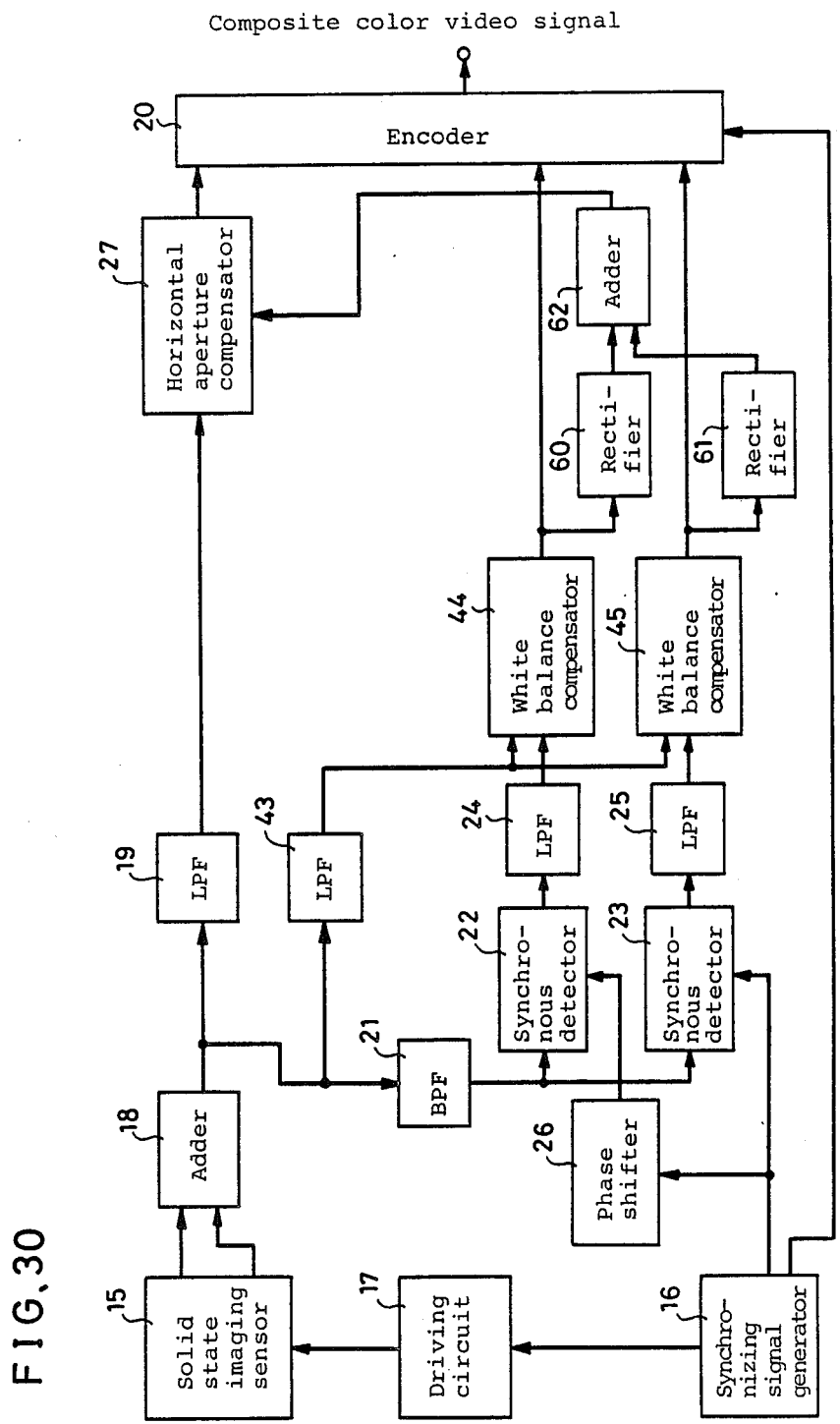

FIG. 30 is a circuit block diagram of an eleventh embodiment, wherein the undesirable interference signal generated when the objective image has a high color saturation can be removed. In the circuit of FIG. 30, numerals 15-45 show components and parts already described in the seventh embodiment of FIG. 26, accordingly redundant superposed descriptions are omitted herein. This embodiment further has rectifier 60 and 61 which rectify output signals of the white balance compensation circuits 44 and 45, respectively, and also has an adder 62 which adds output signals of the rectifiers 60 and 61, and provides a resultant added output to the horizontal aperture compensation circuit 27.

In this embodiment, even when the color temperature of the light source illuminating the objective image changes, the white-balance compensation circuits 44 and 45 compensate the color temperature in two different color signals, and the white-balanced color difference signals are fed to the rectifiers 60 and 61 which rectify the color difference signals to produce single polarity signals to be routed to adder 62. The added signal is given to the horizontal aperture compensation circuit 27 as the control signal. In the horizontal aperture compensation circuit, amplitude of the horizontal aperture compensation signal is lowered for the part of the image where the image has the high color saturation and the control signal has a large amplitude, thereby to decrease horizontal aperture compensation value. Therefore, irrespective of the color saturation of the objective image, generation of the undesirable interfering signal to be produced at the objective image of high color saturation part is prevented. The color carrier suppressing ratio of $\frac{1}{2}f$ color carrier to luminance signal can be kept under a predetermined level, thereby enabling prevention of undesirable noise on the image.

Figure 31:
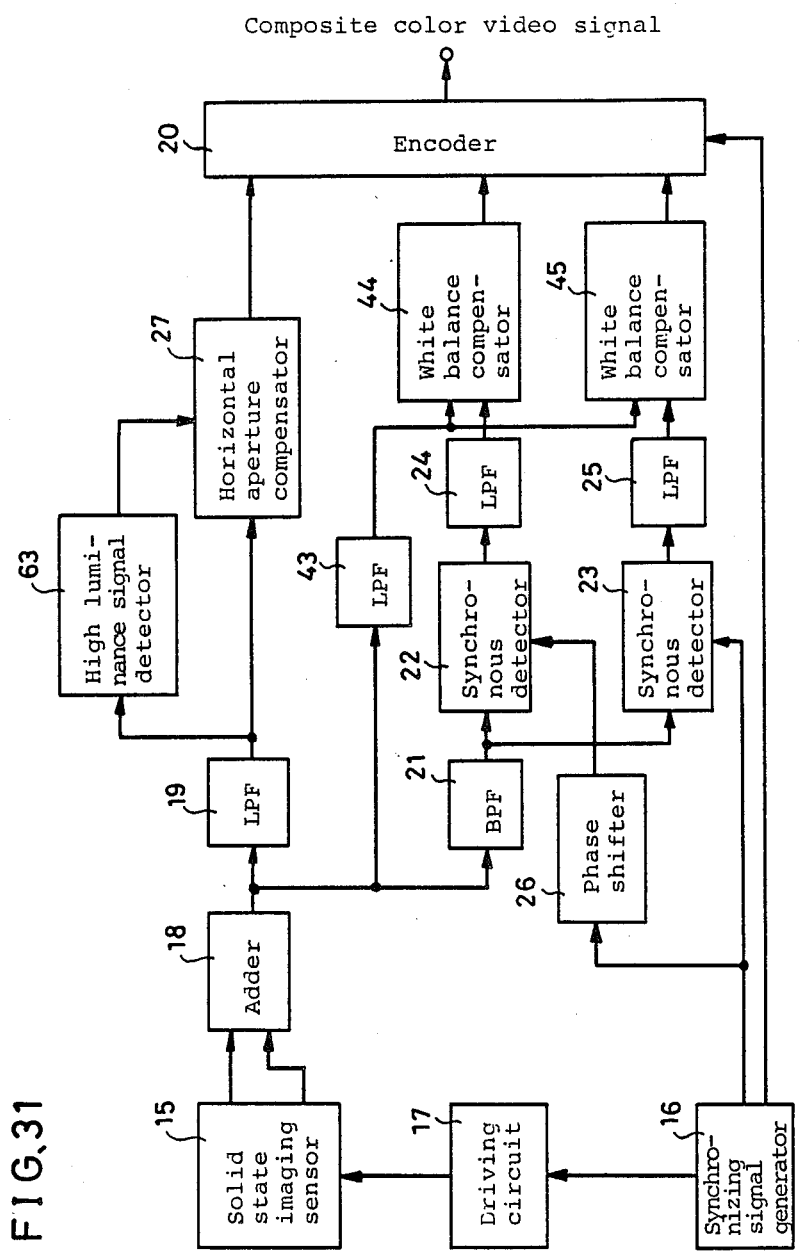

FIG. 31 is a circuit block diagram of a twelfth embodiment. In the circuit of FIG. 31, numerals 15-45 correspond to those described for the seventh embodiment of FIG. 26, and no redundant superposed description is made. This embodiment further has a high luminance detection circuit 63.

Two simultaneously read-out signals indicative of two horizontal lines of the solid state imaging sensor 15 are fed to the adder 18, and an outut signal of the adder 18 is fed to the low pass filter 19 having a pole frequency of $\frac{2}{3}f$, thereby cutting off an unnecessary high frequency range to produce the luminance signal. Two signals of the two horizontal lines of the solid state imaging sensor 15 both have modulated chrominance signal components of $\frac{1}{2}f$ frequency, which modulated chrominance signals are off-set and removed, by adding to each other in the adder 18. Accordingly, the luminance signal can be utilized up to the frequency range of $\frac{2}{3}f$ as has been described in the foregoing embodiment. However, with regard to the output characteristics of the output parts 11a and 11a' of the two horizontal CCDs 10a and 10a' of the solid state imaging sensor 15, the linear characteristic of the output of one CCD becomes more quickly saturated than that of the other CCD when the amount of the light is large as shown in FIG. 32. The phenomenom is caused by the imbalance of the dynamic range of the CCD output. modulated chrominance signal which is removed by off-setting in the adder 18 can not be performed satisfactorily, thereby retaining an undesirable interfering signal in the frequency range of luminance signal. This embodiment is effective for such a case as follows. The luminance signal output from the low pass filter 19 is fed to the high luminance signal detection circuit 63 and detects an occurrence of such excessively high luminance signal, and the detected signal is fed to the horizontal aperture compensation circuit 27 as its control signal. Accordingly, the horizontal aperture compensation circuit 27 decreases an amplitude of the horizontal aperture compensation signal when the luminance signal is excessively high, thereby decreasing the compensation value. Thus, the difference between the photoelectric characteristic of two horizontal lines to be simultaneously read out of the solid state image sensor, especially the difference of saturation levels of the photodiodes due to difference of the saturation level under a high brightness object above a predetermined level producing the interfering signal of $\frac{1}{2}f$, can be effectively removed.

Figure 33:
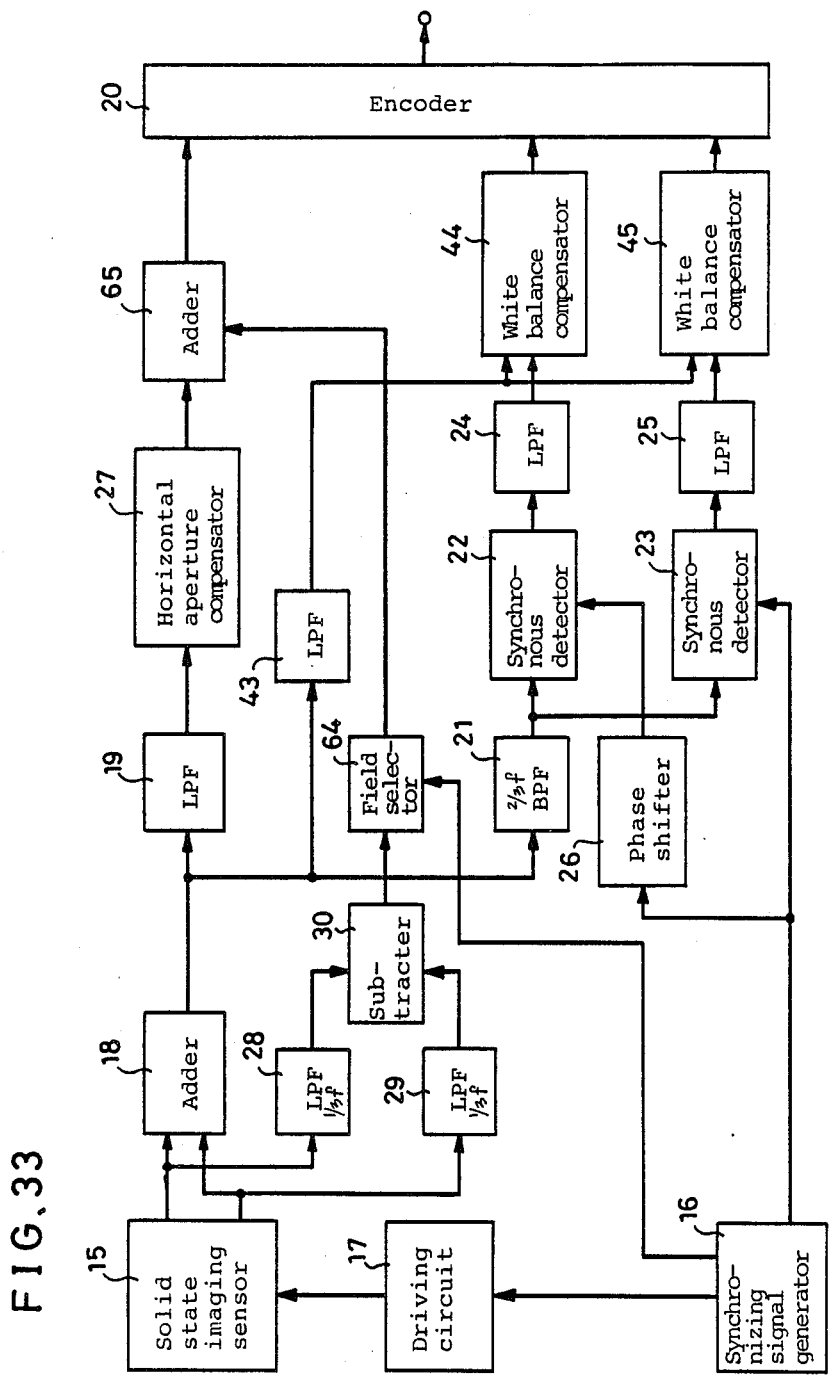
FIG. 33 is a circuit block diagram of a thirteenth embodiment.

FIG. 33 shows a thirteenth embodiment which is effective in improving unsatisfactory vertical resolution. In the solid state imaging apparatus in accordance with the present invention, signals for plural neighboring horizontal lines of photodiodes are simultaneously read out within one horizontal scanning period, and the read-out horizontal line signals are added to produce a luminance signal and chrominance signal. Accordingly, there is a problem that vertical resolution can not achieve a theoretically highest resolution, which the number of horizontal lines of photodiodes theoretically will achieve, thereby actually generating a video signal having unsatisfactory vertical resolution for the number of horizontal lines. This embodiment aims to improve such unsatisfactory vertical resolution. In the circuit diagram of FIG. 33, component circuits 15-45 are substantially identical to those described in the seventh embodiment, and accordingly redundant superposed descriptions are omitted. This embodiment further comprises a field selector 64 and an adder 65. Two output signals of the two horizontal photodiodes of the solid state imaging sensor are led through the low pass filters 28 and 29, to remove the color carrier of $\frac{1}{2}f$ and fed to the subtractor 30. The output signal of the subtractor 30 is fed to the field selector 64, which generates, alternatively in synchronism with start of a new field, positive polarity and negative polarity color difference signals from the subtractor 30. The output signal from field selector 64 is routed to the adder 65 as a vertical aperture compensation signal. Thus, by adding the vertical aperture compensation signal to the luminance signal, which has been compensated for the horizontal aperture, the lowering of the vertical resolution of the luminance signal owing to adding of the two simultaneously read-out signals of the two horizontal lines can be prevented.

Figure 34:
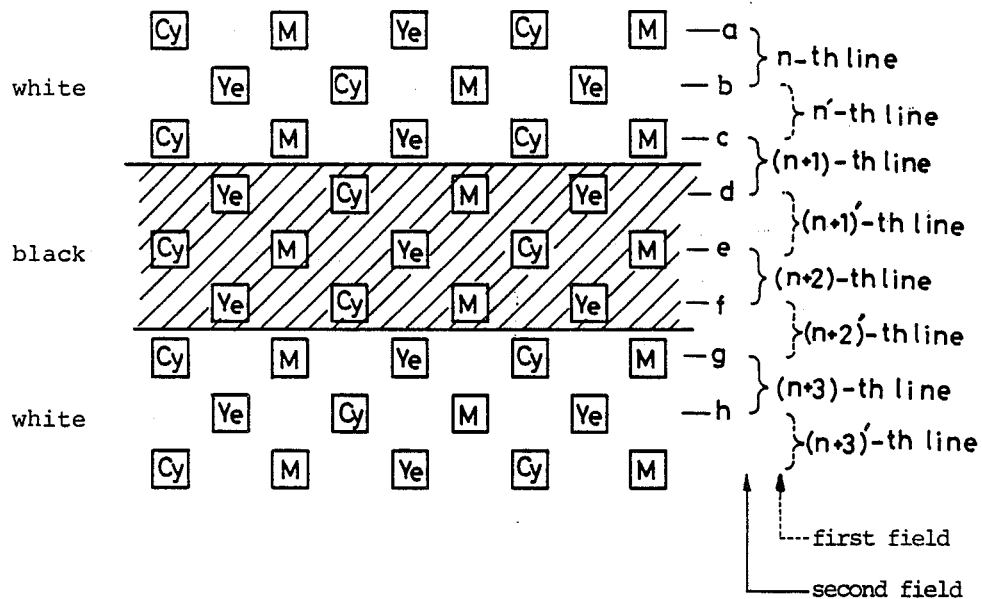
FIG. 34 is a front view showing relative disposition of the object and photodiodes with filters.
Figure 35:
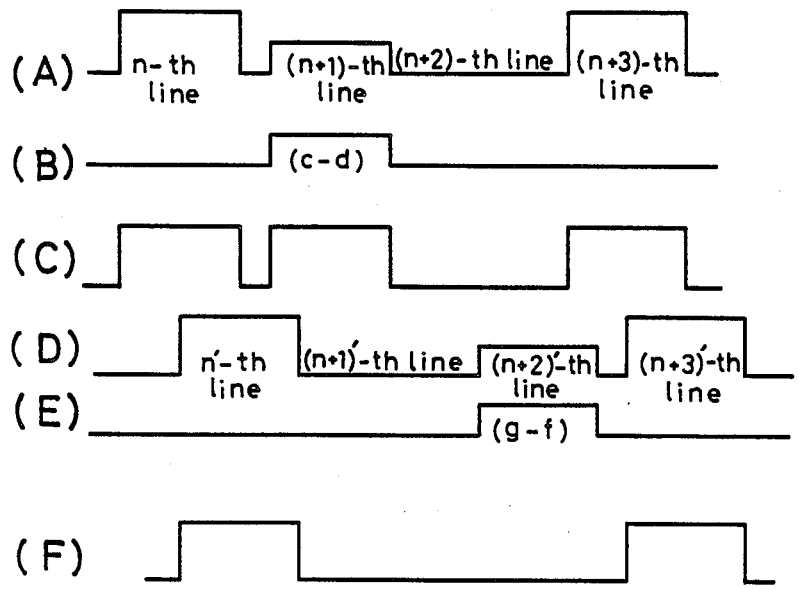
FIG. 35 is a graph showing signal waves when the object shown in FIG. 34 is picked up.

The operation of the embodiment of FIG. 33 is described with reference to FIG. 34 showing an objective image to be picked up and FIG. 35 which is a time chart graph of signals, wherein the horizontal direction shows time and the vertical direction shows levels. FIG. 34 shows such an objective image that in the first field, the objective image changes from the white to the black region at the time of (n+1)-th line of vertical scanning, and accordingly in a horizontal line signal of the (n+1)-th horizontal scanning period the two signals of two horizontal lines c and f of FIG. 34 give a color difference signal shown by signal (B) of FIG. 35. By adding this color difference signal (B) to the luminance signal A shown in FIG. 35, the vertical resolution can be compensated to the characteristic to be given by the vertical numbers of photodiodes of the solid state imaging sensor as shown in the curve C of FIG. 35.

Nextly, in the second field, the objective image changes from black to white regions at the (n+2)'-th horizontal line of the vertical scanning. Accordingly, a difference signal E is produced from the subtractor 30 which produces signals f and g which are simultaneously read out within a period of one horizontal scanning of the (n+2)'-th horizontal line. The difference signal is fed to the luminance signal D of FIG. 35 in the adder 65 similarly to the case of the first field. However, in this case, the polarity of the luminance signal and the difference signal are opposite, so the difference signal has its polarity reversed by the field selector 64 before feeding to the adder 65. Thus, the signal F of FIG. 35 is produced by adding the luminance signal D and the obtained inverse difference signal E.

In the aforementioned embodiments of FIG. 30, FIG. 31 and FIG. 33, for simplicity of description, the vertical correlation detection circuits are omitted. However, any vertical correlation detection circuits shown in the first embodiment through tenth embodiment may be used in these embodiments of FIGS. 30 to 33.

Figure 36:
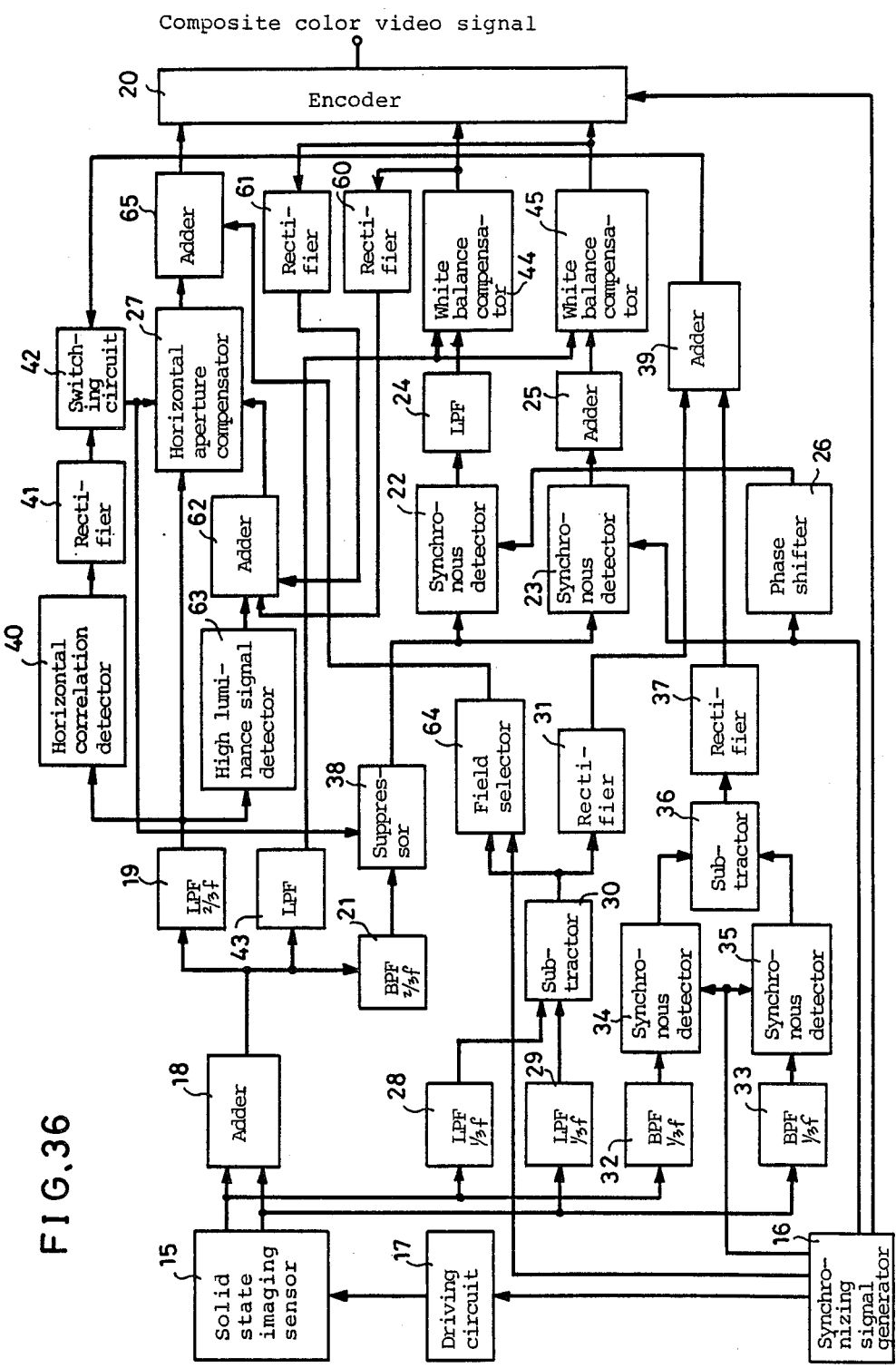
FIG. 36 is a circuit of block diagram of a fourteenth embodiment of a color solid state imaging apparatus of the present invention.

FIG. 36 is a block diagram of a fourteenth embodiment. In this embodiment, features of embodiments 6, 11, 12 and 13 are combined together, and therefore their components and functions thereof are substantially the same, and redundant superposed descriptions are omitted. In the above-mentioned second to sixth embodiments, descriptions are made of synchronized detection of the ½f color carrier, for detecting correlation of color difference signals of simultaneously read-out plural lines of photodiodes, utilizing $\sin \omega t$ or $\cos \omega t$ as reference signals. Put in actual synchronized detection, such alternative signal processing may be used that firstly making synchronized detections separately with reference signals $\sin \omega t$ and $\cos \omega t$, and later subtracting the synchronized detected signals, correlation of the synchronized detected signals are found.

When the largeness of the vertical correlation is detected by using the two simultaneously read out chrominance difference signals, the modulated chrominance signal obtained from the output part of the two CCDs are put in synchronized detection. Then, in the second to six embodiments, the modulated chrominance signal obtained from each CCD output part is put in synchronized detection on one axis, for example, SIN, or COS. But, it is preferable that the modulated chrominance signal is put respectively in synchronized detection on the two axes SIN, COS and the chrominance difference signal components thus obtained are subtracted, thereby to detect the largeness of the vertical correlation.

As has been described with reference to many embodiments, the solid state imaging apparatus in accordance with the present invention, which simultaneously reads out signals of plural vertically disposed horizontal lines of photoelectric elements and adds the obtained signals of the horizontal lines to produce luminance signal, the following effects are achieved.

(1) Undesirable interference signal in the luminance signal frequency range and undesirable spurious chrominance signal produced at the vertical edge part, which are produced when the vertical correlation is low, are removed.

(2) Interfering signals to be produced in the luminance signal frequency range when an objective image of very high color saturation is picked up, can be removed.

(3) Interfering signals to be produced in the luminance signal frequency range due to inbalance of saturation characteristics in plural horizontal lines which are simultaneously read out can be removed.

(4) Lowering of vertical resolution of the luminance signal, which is obtained by adding plural signals simultaneously read out from plural horizontal lines of photoelectric elements within one period, can be compensated.

What is claimed is:

1. A solid state color imaging apparatus comprising:
   a solid state imaging sensor comprising a plurality of photoelectric elements regularly disposed in a two-dimensional pattern comprising a plurality of horizontal lines extending in a horizontal direction, each horizontal line having a plurality of photoelectric elements in repetition at a predetermined horizontal pitch;
   a color filter disposed substantially in front of said solid state imaging sensor and comprising a plurality of color filter elements having three spectral distributions disposed in a predetermined order of repetition in said horizontal direction;
   said solid state imaging sensor having a structure such that each photoelectric element is connected to one of a plurality of vertically disposed signal lines, wherein all of the photoelectric elements connected to any given one of said vertically disposed signal lines receive light through color filter elements having the same spectral distribution, and such that plural signals corresponding to a predetermined number of vertically neighboring horizontal lines of photoelectric elements can be simultaneously read out;
   circuit means for producing at least one of: (a) first plural luminance signals, (b) first plural chrominance signals, (c) a second luminance signal, and (d) at least one second chrominance signal from said simultaneously read-out signals;
   correlation detection circuit means for detecting the amount of vertical correlation between at least one of (a) said first plural luminance signals and (b) said first plural chrominance signals; and
   suppressing circuit means for altering a characteristic of at least one of (a) said second luminance signal and (b) said at least one second chrominance signal, based on said amount of vertical correlation detected by said correlation detection circuit means.

2. A solid-state color imaging apparatus in accordance with claim 1, wherein
   said suppressing circuit means includes a horizontal aperture compensation circuit which processes said second luminance signal responsive to a compensation signal level, and means for controlling said compensation signal level.

3. A solid state color imaging apparatus in accordance with claim 1, which further comprises
   horizontal correlation detecting circuit means, for detecting the amount of horizontal correlation in said second luminance signal; and
   disabling means for disabling operation of said suppressing circuit means when said amount of horizontal correlation is below a predetermined level.

4. A solid state color imaging apparatus in accordance with claim 1, wherein said suppressing circuit means includes a horizontal aperture compensation circuit which processes said second luminance signal responsive to a compensation signal, and which further comprises detecting means for detecting the amplitude of said second luminance signal; and control means for controlling a level of said compensation signal when the amplitude of said second luminance signal detected by said detecting means is above a predetermined level.

5. A solid state color imaging apparatus in accordance with claim 1, wherein there are two of said correlation detection circuit means, and said two correlation detection circuit means each produce a difference between a current chrominance signal and a chrominance signal which is delayed by one horizontal scanning period of said solid state imaging sensor, and further comprise an adder for adding the differences produced by said two correlation detection circuit means to produce information indicative of said amount of vertical correlation, wherein said suppressing circuit means is also for suppressing an interference signal inherent in one of said second luminance signal and said at least one second chrominance signal.

6. A solid state color imaging apparatus in accordance with claim 5, which further comprises horizontal correlation detecting circuit means for detecting the amount of horizontal correlation in said second luminance signal, and disabling means for stopping said suppressing means from suppressing said interference signal when said amount of horizontal correlation is below a predetermined level.

7. A solid-state color imaging apparatus in accordance with claim 1, wherein said circuit means produces said at least one of (a) said first plural luminance signals by producing low-frequency components of said simultaneously read-out signals, and (b) said first plural chrominance signals by producing band-pass frequency components of said simultaneously read-out signals; and said correlation detection circuit means detects said amount of vertical correlation between said at least one of (a) said first plural luminance signals by subtracting one of said low-frequency components from another of said low-frequency components and (b) said first plural chrominance signals by subtracting one of said band-pass frequency components from another of said band-pass frequency components.

8. A solid-state color imaging apparatus in accordance with claim 1, wherein:

said circuit means produces said first plural luminance signals by producing low-frequency components of said simultaneously read-out signals;

said correlation detection circuit means comprises means for subtracting one of said first plural luminance signals from another of said first plural luminance signals to produce a vertical correlation signal representing said amount of vertical correlation; and said suppressing circuit means comprises means for periodically inverting the polarity of said vertical correlation signal and means for adding said periodically-inverted vertical correlation signal to said second luminance signal.

9. A method for compensating chrominance and luminance signals of a color television camera, comprising the steps of:

disposing photoelectric elements and color filters of a solid state imaging device into a plurality of horizontal lines in a manner such that modulated chrominance signals differing from each other by 180° of phase can be obtained from two neighboring horizontal lines;

simultaneously reading out signals from two neighboring horizontal lines of said imaging device;

obtaining added signals by adding said simultaneously read out signals;

obtaining at least one of (a) a luminance signal and (b) a chrominance signal from said added signals;

obtaining a first difference signal between low frequency components of said simultaneously read out signals and a second difference signal between chrominance signal components of said simultaneously read-out signals; and controlling the bandwidth of said luminance signal by using said first and second difference signals as control signals.

10. A method for compensating chrominance and luminance signals of a solid-state color television camera in accordance with claim 9, further comprising the steps of:

obtaining a third difference signal between said luminance signal and a delayed signal obtained by delaying said luminance signal a predetermined time; and terminating said control signals when said third difference signal is larger than a predetermined value.

11. A method for compensating chrominance and luminance signals of a solid-state color television camera in accordance with claim 9, further comprising the step of effectively preventing said control signals from being used when the level of said luminance signal is larger than a predetermined level.

12. A method for compensating chrominance and luminance signals of a solid-state color television camera in accordance with claim 9, comprising the further step of:

periodically inverting the polarity of said first difference signal and adding said periodically-inverted first difference signal to said luminance signal.

13. A method for compensating chrominance and luminance signals of a solid-state color television camera, comprising the steps of:

disposing photoelectric elements and color filters of a solid-state imaging device into a plurality of horizontal lines in a manner such that modulated chrominance signals differing from each other by 180° of phase can be obtained from two neighboring horizontal lines;

reading out signals of two neighboring two horizontal lines of said imaging device simultaneously;

obtaining added signals by adding said simultaneously read-out signals;

obtaining a luminance signal and a chrominance signal from said added signals;

obtaining a first difference signal between low frequency components of said read-out signals and a second difference signal between chrominance signal components of said read-out signals; and controlling the level of said chrominance signal by using said first and second difference signals as control signals.

14. A method for compensating chrominance and luminance signals of a solid-state color television camera comprising the steps of:
- disposing photoelectric elements and color filters of a solid state imaging device into a plurality of horizontal lines in such manner that modulated chrominance signals differing from each other in phase by 180° can be obtained from two neighboring horizontal lines;
- simultaneously reading out signals from two neighboring horizontal lines of said imaging device;
- obtaining first and second luminance signals and a chrominance signal from signals obtained by adding said read out signals;
- obtaining a first difference signal by subtracting said second luminance signal from a signal obtained by delaying said second luminance signal for one horizontal scanning period of said solid-state imaging device;
- obtaining a second difference signal by subtracting said first luminance signal from a signal obtained by delaying said first luminance signal for a predetermined period;
- controlling the bandwidth of said first luminance signal by using said first difference signal as a control signal; and
- terminating said controlling when said second difference signal is larger than a predetermined level.

15. An apparatus for compensating chrominance and luminance signals of a color television camera, comprising:
- a plurality of photoelectric elements and color filters of a solid-state imaging device disposed in horizontal lines, such that modulated chrominance signals differing from each other in phase by 180° can be produced by two neighboring horizontal lines;
- means for simultaneously reading out signals indicative of two neighboring horizontal lines;
- means for adding said read out signals to obtain added signals;
- means for obtaining at least one of a luminance signal and a chrominance signal from said added signals;
- means for obtaining a first difference signal between low frequency components of said read-out signals;
- means for obtaining a second difference signal between chrominance components of said read-out signals; and
- means for controlling the bandwidth of said luminance signal by using first and second difference signals as control signals.

16. An apparatus for compensating chrominance and luminance signals of a solid-state color television camera in accordance with claim 15, further comprising:
- means for obtaining a third difference signal between said luminance signal and a delayed signal obtained by delaying said luminance signal a predetermined time; and
- means for preventing said controlling means from using said control signals when said third difference signal is larger than a predetermined value.

17. An apparatus for compensating chrominance and luminance signals of a solid-state color television camera in accordance with claim 15,
- further comprising means for effectively preventing said controlling means from using said control signals when the level of said luminance signal is larger than a predetermined level.

18. An apparatus for compensating chrominance and luminance signals of a solid-state color television camera in accordance with claim 15, further comprising:
- means for periodically inverting the polarity of said first difference signal; and
- means for adding said periodically-inverted first difference signal to said luminance signal.

19. Apparatus for compensating chrominance and luminance signals of a solid-state color television camera comprising:
- a plurality of photoelectric elements and color filters of a solid-state imaging device disposed in a plurality of horizontal lines in such a manner that modulated chrominance signals differing from each in phase by 180° can be obtained from two neighboring horizontal lines;
- means for reading out signals of two neighboring horizontal lines simultaneously;
- means for adding said read out signals to produce added signals;
- means for obtaining first and second luminance signals and a chrominance signal from said added signals;
- means for obtaining a first difference signal by subtracting said second luminance signal from a signal obtained by delaying said second luminance signal for one horizontal scanning period of said solid-stage imaging device;
- means for obtaining a second difference signal by subtracting said first luminance signal from a signal obtained by delaying said first luminance for a predetermined period;
- means for controlling the bandwidth of said first luminance signal by using said first difference signal as a control signal; and
- means for preventing said controlling means from using said control signal when said second difference signal is larger than a predetermined level.

* * * * *